United States Patent
Canal et al.

(10) Patent No.: US 12,499,178 B2
(45) Date of Patent: Dec. 16, 2025

(54) SYSTEMS AND METHODS FOR PREFERENCE AND SIMILARITY LEARNING

(71) Applicant: Georgia Tech Research Corporation, Atlanta, GA (US)

(72) Inventors: Gregory Canal, Atlanta, GA (US); Christopher John Rozell, Atlanta, GA (US); Stefano Fenu, Atlanta, GA (US); Mark Davenport, Atlanta, GA (US); Andrew Massimino, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1170 days.

(21) Appl. No.: 17/428,598

(22) PCT Filed: Feb. 3, 2020

(86) PCT No.: PCT/US2020/016379
§ 371 (c)(1),
(2) Date: Aug. 4, 2021

(87) PCT Pub. No.: WO2020/163224
PCT Pub. Date: Aug. 13, 2020

(65) Prior Publication Data
US 2022/0129709 A1 Apr. 28, 2022

Related U.S. Application Data

(60) Provisional application No. 62/800,666, filed on Feb. 4, 2019, provisional application No. 62/800,686, filed on Feb. 4, 2019.

(51) Int. Cl.
*G06F 16/00* (2019.01)
*G06F 17/11* (2006.01)
*G06F 18/21* (2023.01)

(52) U.S. Cl.
CPC .......... *G06F 18/2185* (2023.01); *G06F 17/11* (2013.01)

(58) Field of Classification Search
CPC .... G06F 17/18; G06F 18/213; G06F 16/9535; G06F 16/2457; G06F 18/2413;
(Continued)

(56) References Cited

U.S. PATENT DOCUMENTS

| | | |
|---|---|---|
| 2007/0087756 A1 | 4/2007 | Hoffberg |
| 2016/0342902 A1 | 11/2016 | Pinckney et al. |

(Continued)

OTHER PUBLICATIONS

Search Report from EP Application No. 20 75 3214 dated Nov. 21, 2022.
(Continued)

*Primary Examiner* — Yicun Wu
(74) *Attorney, Agent, or Firm* — TROUTMAN PEPPER LOCKE LLP; Ryan A. Schneider; Dustin B. Weeks

(57) ABSTRACT

Systems and methods for preference and similarity learning arc disclosed. The systems and methods improve efficiency for both searching datasets and embedding objects within the datasets. The systems and methods for preference embedding include identifying paired comparisons closest to a user's true preference point. The processes include removing obvious paired comparisons and/or ambiguous paired comparisons from subsequent queries The systems and methods for similarity learning include providing larger rank orderings of tuples to increase the context of the information in a dataset In each embodiment, the systems and methods can embed user responses in a Euclidean space such that distances between objects are indicative of user preference or similarity.

9 Claims, 10 Drawing Sheets

(58) Field of Classification Search
CPC .... G06F 17/11; G06F 9/4451; G06F 18/2185; G06F 9/451; G06T 11/206; G06Q 30/02; G06N 5/048; G06N 20/00; G06N 3/043; G06N 3/045; G06V 10/764; G06V 10/82; G06V 10/25; G06V 40/171
See application file for complete search history.

(56) References Cited

U.S. PATENT DOCUMENTS

2018/0144518 A1* 5/2018 Vlassis .................. G06F 17/18
2018/0204111 A1 7/2018 Zadeh et al.

OTHER PUBLICATIONS

Tamuz, et al., "Adaptively Learning the Crown Kernel," 2011 Proceedings of the 2th International Conference on Machine Learning.

International Search Report and Written Opinion dated May 7, 2020 issued in PCT International Application No. PCT/US2020/016379.

* cited by examiner

SYSTEMS AND METHODS FOR PREFERENCE AND SIMILARITY LEARNING

CROSS REFERENCE TO RELATED APPLICATIONS

This application claims priority, and benefit under 35 U.S.C. § 119(e), to U.S. Provisional Patent Application No. 62/800,666, filed Feb. 4, 2019, and to U.S. Provisional Patent Application No. 62/800,686, filed Feb. 4, 2019. The entire contents of these applications are incorporated herein by reference in their entirety as if fully set forth below.

STATEMENT OF RIGHTS UNDER FEDERALLY SPONSORED RESEARCH

This invention was made with government support under N00014-15-1-2619 awarded by the Office of Naval Research, and under 1350954 awarded by the National Science Foundation. The government has certain rights in the invention.

FIELD OF THE DISCLOSURE

The present disclosure relates generally to systems and methods for preference and similarity learning and, more particularly, to systems and methods for adaptive selection of ordinal queries to improve efficiency in learning tasks such as preference and similarity embedding and search.

BACKGROUND

Preference and similarity learning of objects within a dataset is an important process for systems that prioritize search and recommendations of the objects within the dataset. Consider for example settings where relationships between the objects are understood by their relational comparison to each other. In advertising, for example, an embedding of the objects within the dataset can be based on a potential customer's preference among the items. In the healthcare setting, medical device parameters may be customized based on ideal parameters determined by a medical expert, and these ideal parameters may also be based on preferences for or similarities to certain medical outcomes. In the product customization setting, product design possibilities may be searched based on consumer preference or according to the similarity by which customers perceive the product possibilities.

To date, systems and methods for learning preference and similarity of objects have certain drawbacks. In preference embedding and searching, for example, paired comparisons may be used to ascertain a user's preference. Some previous methods of using paired comparisons involve modeling user preferences as linearly-weighted vectors. These methods are "fixed" in that they do not adapt or change their queries presented to the user as more information is gathered about the user preferences within a dataset. Other systems that may be considered adaptive fail to model or handle noise in their active query-selection algorithms. The systems also fail to reduce queries that may be obvious or redundant.

In related similarity learning, Crowd Kernel Learning (CKL) is the strategy often used for query selection. CKL is a method of selecting triplets, a "head" object and two "body" objects that are compared by similarity to the head object, in an attempt to maximize the mutual information between a query response and the embedding coordinates of the "head" object. CKL, however, does not apply to ordinal queries of general tuples sizes (k>3), and a naive extension to tuples would be computationally punitive. CKL's formulation of mutual information also only measures the information a query provides about the embedding coordinates of the head object, disregarding information about the locations of the other objects in the query.

What is needed, therefore, are systems and methods that can efficiently identify and remove redundant and noisy queries for preference embedding and searching. Systems and methods are also needed that use mutual information to assess select query candidates with increased informativeness. Aspects of the present disclosure address these and other issues.

BRIEF SUMMARY

Embodiments of the present disclosure address these needs as well as other needs that will become apparent upon reading the description below in conjunction with the drawings. The present disclosure relates generally to systems and methods for preference and similarity learning. Particularly, systems and methods of the present disclosure relate to adaptive selection of ordinal queries to improve efficiency in learning tasks such as preference and similarity embedding and search.

According to some embodiments, there is provided a method of embedding a user preference including: receiving, at an input/output interface, a dataset comprising a plurality of items; identifying, with a processor, a paired comparison of a first item and a second item of the plurality of items for transmittal to a user device for comparison; receiving, at the input/output interface, a user preference of the first item over the second item to create a user preference point; and embedding, with the processor, the user preference point in a space with the plurality of items, the user preference point being embedded in the space such that a distance between the user preference point and respective items of the plurality of items is indicative of the user preference of the respective items.

According to some embodiments, there is provided a system including: an input/output interface configured to communicate with a user device and to receive a dataset comprising a plurality of items; a processor in communication with the input/output interface; and a memory in communication with the processor and storing instructions that, when executed, cause the system to: identify a paired comparison of a first item and a second item of the plurality of items for transmittal to a user for comparison; receive a user preference of the first item over the second item to create a user preference point; and embed the user preference point in a space with the plurality of items, the user preference point being embedded in the space such that a distance between the user preference point and respective items of the plurality of items is indicative of the user preference of the respective items.

According to some embodiments, there is provided a method of embedding similar objects into a similarity matrix including: receiving, at an input/output interface, a dataset comprising a plurality of objects; selecting, with a processor, a first head object and a first set of body objects from the plurality of objects for a first ranking, the selection based on maximizing mutual information to be gained from the first ranking in the dataset, the first set of body objects comprising at least three objects; outputting for transmission, from the input/output interface, a first query to a user device of an oracle, the first query comprising the first head object and the first set of body objects; receiving, at the input/output interface and from the user device of the oracle, a first ranking by an oracle indicative of a ranking of the first set of body objects based on similarity to the first head object; and embedding, with the processor, the first set of body objects into the similarity matrix based on the first ranking, wherein objects in the similarity matrix are positioned within the similarity matrix such that distances between any two objects are indicative of similarity between the two objects.

According to some embodiments, there is provided a system for embedding similar objects into a similarity matrix including: an input/output interface configured to communicate with a user device; a processor in communication with the input/output interface; and a memory in communication with the processor and storing instructions that, when executed, cause the system to: receive a dataset comprising a plurality of objects; select a first head object and a first set of body objects from the plurality of objects for a first ranking, the selection based on maximizing mutual information in the dataset; output for transmission a first query to the user device of an oracle, the first query comprising the first head object and the first set of body objects; receive from the user device a first ranking of the first query, the first ranking representing an oracle raking of the first set of body objects based on similarity to the first head object; and embed the plurality of objects into the similarity matrix based on the first ranking, wherein objects in the similarity matrix are positioned within the similarity matrix such that distances between any two objects are indicative of similarity between the two objects, wherein the first set of body objects comprises at least three objects.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
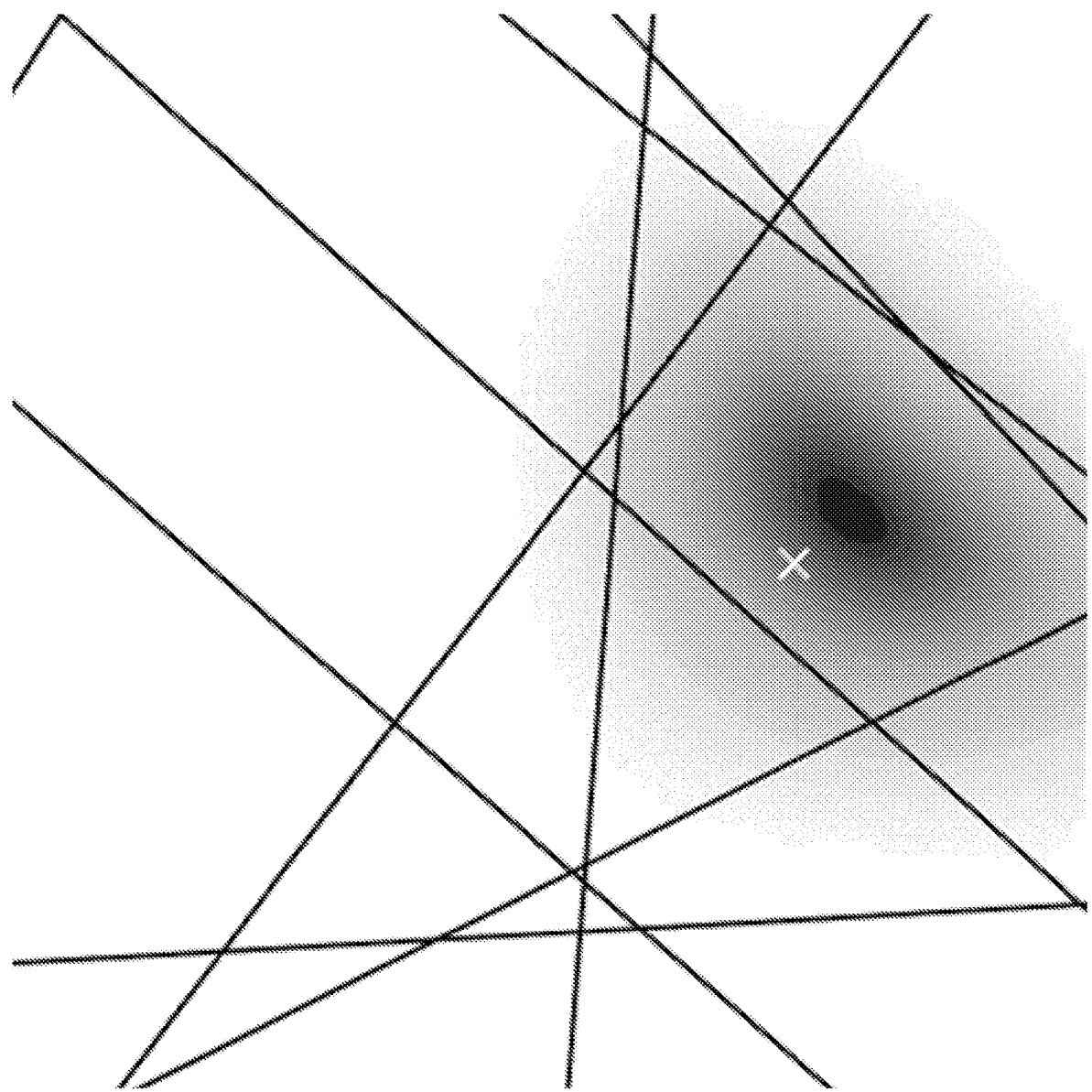
FIG. 1 is a graphical representation depicting paired comparisons modeled or as a set of noisy hyperplanes, according to some embodiments of the present disclosure.

Identifying preferences and similarities between objects is an important process for any number of applications that rely on relationships between a plurality of objects. As described above, digital advertising, heath care, and product development settings, to name a few, can benefit from adaptive techniques that identify similarities between objects in a dataset and/or that locate a particular user's preference in the dataset. As will be described in greater detail herein, an "object" can refer to a piece of data that identifies an item. In a high-dimensional space, these "objects" can be images, audio, video, and the like. In a low-dimensional space, the "objects" can include the semantic information that humans attribute to those images, audio, video, etc., for example words, labels, or specific items.

The present systems and methods relate to techniques to reconfigure the dataset to indicate the relationship between the objects therein. Furthermore, the systems and methods describe solutions to the downfalls of previous preference and similarity data construction and search.

Preference Embedding and Search

Suppose a user of a preference-searching system wishes to estimate a user's preference vector w from paired comparisons of the form "does user w prefer item p or item q?", wherein both the user and items (objects) are embedded within a dataset where distances between objects reflect user and object similarities. Such observations arise in numerous settings, including search tasks, advertising, recommender systems, and psychometrics and psychology experiments. In such tasks, queries can be extremely costly and subject to varying levels of response noise. Related art methods of measuring and identifying user preference were not ideal, as they did not to adapt to noise in the query-selection algorithms or reduce queries that may be obvious or redundant. The related art methods also have the shortcoming in that they are limited to binary comparisons (A vs B).

Aspects of the present disclosure describe the task of user preference learning, where a set of objects (e.g., movies, music, food, etc.) can be embedded in a Euclidean space. The preferences of the user can be represented as a continuous point in the same space (rather than simply a rank ordering over the items) so that the preference point is close to items the user likes and far from items the user dislikes. In some examples, the user preference point can be estimated using a method of paired comparisons, where, during a sequence of interactions, a user chooses which of two given items they prefer. For instance, to characterize a person's taste in food, the user may be asked which one of two dishes they would rather eat for a number of different pairs of dishes. The recovered user response preference point can be used in various tasks, for instance in the recommendation of nearby restaurants, personalized product creation, or clustering of users with similar preferences.

The entire process of querying via paired comparisons and continuous preference point estimation can be described as pairwise search, which is distinct from the problem of searching for a single discrete item in the fixed dataset. One novel benefit of the present systems and methods for preference embedding and searching derives from actively choosing the items in each query to the user in a way that generates more information, i.e., the system actively selects informative queries. To illustrate, given N objects or items in a dataset, there are O ($N^2$) possible paired comparisons. Querying all such pairs is prohibitively expensive and complex for large datasets. However, querying each pair is not necessary, since not all queries are informative; some queries are rendered obvious by the accumulation of evidence about the user's preference points, while others are considered ambiguous due to noise in the comparison process.

The present systems and methods describe multiple query-selection algorithms (e.g., an equiprobable, max-variance scheme and a mean cut, max-variance scheme) for pairwise search that automatically selects more informative pairs by directly modeling redundancy and noise in user responses.

Referring again to embedding objects within a dataset, in some examples, the objects can be embedded into the dataset and then reconfigured. In some implementations, the embedding of the items can be constructed through a training set of triplet comparisons (paired comparisons regarding similarity of two items to a third reference item) using one of several standard non-metric embedding techniques, including but not limited to the Crowd Kernel Learning technique, the Stochastic Triplet Embedding technique, or other crowd-sourced training techniques (e.g., triplet training techniques). In other examples, the embedding can be completed by other techniques, including but not limited to the active ordinal querying for tuplewise similarity learning described herein.

In some examples, a noisy observation model can be assumed where the probability of a user located at w choosing item p over item q in a paired comparison is modeled using Equation 1:

$$P(p \prec q) = f(k_{pq}(\|w-q\|^2 - \|w-p\|^2)),$$  Equation 1 where $p \prec q$ denotes "item p is preferred to item q," $f(x) = 1/(1+e^{-x})$ is the logistic function, and $k_{pq}$ is the pair's noise constant, which represents roughly the signal-to-noise ratio of a particular query and can depend on the values of p and q. Equation 1 can be written as $$P(p \prec q) = f(k_{pq}(a^T w - b)),$$

where $a = 2(p-q)$ and $b = \|p\|^2 - \|q\|^2$, and encodes the normal vector and threshold of a hyperplane bisecting items p and q. After a number of such queries, the response model in Equation 1 for each query can be multiplied to form a posterior belief about the location of w. FIG. 1 is a graphical representation depicting paired comparisons modeled or as a set of noisy hyperplanes, according to some embodiments of the present disclosure. In the high-fidelity case, such a representation uniquely identifies a convex region of $\mathbb{R}^d$. In general, the representation is a posterior distribution which approximates the shape of the ideal cell around the true user preference point, depicted with an "x" in FIG. 1.

In some examples, the noise constant $k_{pq}$ can differ for each item pair to enable for differing user behavior depending on the geometry of the items being compared. When $k_{pq} \to \infty$, this supposes a user's selection is made with complete certainty and cannot be erroneous. Conversely, $k_{pq} = 0$ corresponds to choosing items randomly with probability ½. Varying $k_{pq}$ enables differing reliability when items are far apart versus when they are close together. Some examples of this parameter include:

$$\text{constant: } k_{pq}^{(1)} = k_0,$$  (K1)

$$\text{normalized: } k_{pq}^{(2)} = k_0 \|a\|^{-1} = \frac{1}{2} k_0 \|(p-q)\|^{-1},$$  (K2)

$$\text{decaying: } k_{pq}^{(3)} = k_0 \exp(-\|a\|)$$  (K3)
$$= k_0 \exp(-2\|(p-q)\|).$$

In selecting the pairs in which to present to a user for subsequent query, minimizing estimation error can lead to information maximization about the dataset. The following description identifies the strategy to minimize estimation error.

$W \in \mathbb{R}^d$ can denote a random vector encoding the user's preference point, which can be assumed for the sake of analysis to be drawn from a uniform distribution over the hypercube $$\left[-\frac{1}{2}, \frac{1}{2}\right]^d$$

denoted by the prior density of $p_0(w)$. Unless noted otherwise, random variables are noted herein with uppercase letters, and specific realizations with lowercase letters. $Y_i \in \{0,1\}$ can denote the binary response to the $i^{th}$ paired comparison involving $p_i$ and $q_i$, with $Y_i = 0$ indicating a preference for $p_i$ and $Y_i = 1$ a preference for $q_i$. After i queries, the vector of responses $Y^i = Y_1, Y_2, \ldots Y_i$ are obtained. It can be assumed that each response $Y^i$ is conditionally independent from the previous responses $Y^{i-1}$ when conditioned on preference W. Applying this assumption in conjunction with a recursive application of Bayes' rule, after i queries, the posterior density is given by Equation 2:

$$p_i(w) \equiv p(w \mid Y^i) = \frac{p_0(w) \prod_{j=1}^{i} p(Y_j \mid w)}{p(Y_i \mid Y^{i-1})}$$  Equation 2 where $p(Y_j|w)$ is given by the model in Equation 1 above. This logistic likelihood belongs to the class of log-concave (LCC) distributions, whose probability density functions $f(\alpha w_1 + (1-\alpha) w_2) \geq f(w_1)^\alpha f(w_2)^{1-\alpha}$ for any $w_1, w_2 \in \mathbb{R}^d$ and $0 \leq \alpha \leq 1$. Since any $p_0(w)$ is log-concave and products of log-concave functions are also log-concave, the posterior density of Equation 2 is log-concave.

After i queries, the posterior $p_i(w)$ can be used to produce a Bayesian user point estimate $\widehat{W}_i$. The mean-squared error of this estimate can be denoted as $MSE_i = \mathbb{E}_{W|Y^i}[\|W-\widehat{W}_i\|_2^2]$, which provides a direct measure of the estimation error and is a quantity that can be minimized by adaptively selecting queries based on previous responses. One approach to minimize the error includes greedily selecting an item pair such that $MSE_{i+1}$ is minimized in expectation after the user responds. This may, however, require both updating the posterior distribution and estimating $MSE_{i+1}$ for each possible response over all item pairs. This can be computationally expensive since the presently described model there is no closed-form solution for $MSE_{i+1}$, and so each such evaluation requires a "lookahead" batch of Monte Carlo samples from the posterior. Specifically, if S posterior samples are generated for each $MSE_{i+1}$ evaluation over a candidate pool of M pairs at a computational cost of C per sample generation, this strategy requires a computational complexity of O((C+d)SM) to select each query. This may be undesirable for adaptive querying settings where data sets are large (resulting in a large number of candidate pairwise queries), and queries should be selected in or close to real-time for the system to be most effective.

Instead, consider the covariance matrix of the user point posterior after i queries, which is denoted as:

$\Sigma_{W|Y^i} = \mathbb{E}[(W-\mathbb{E}[W|Y^i])(W-\mathbb{E}[W|Y^i])^T|Y^i]$.

For the minimum mean-squared error (MMSE) estimator, given by the posterior mean $\widehat{W}_i = \mathbb{E}[W|Y^i]$, then $$MSE_i = Tr(\Sigma_{W|Y^i}) \geq d|\Sigma_{W|Y^i}|^{\frac{1}{d}}$$

where the last inequality follows from the arithmetic-geometric mean inequality (AM-GM). This implies that a necessary condition for a low MSE is for the posterior volume, defined here as the determinant of the posterior covariance matrix, to also be low. However, selecting queries that greedily minimize posterior volume can be computationally expensive in practice since this also requires a set of "lookahead" posterior samples for each candidate pair and possible response, resulting in a computational complexity of $O((C+d^3)SM)$ to select each query.

The present systems and methods utilize tools from information theory to select queries that approximately minimize posterior volume (and hence tend to encourage low MSE) at lower computational costs. The systems and methods also provide convenient analytical tools to enable performance guarantees for the query selection methods herein. To do so, the systems and methods can rely on posterior entropy, which can be defined as the differential entropy of the posterior distribution after i queries in Equation 3:

$h_i(W) \equiv h(W|y^i) = -\int_w p_i(w) \log_2(p_i(w)) dw$.      Equation 3

As is shown in the following lemma, the posterior entropy of LCC distributions is both upper and lower bounded by a monotonically increasing function of posterior volume, implying that low posterior entropy is both necessary and sufficient for low posterior volume, and hence a necessary condition for low MSE. For an LCC posterior distribution $p(w|Y^i)$ in d dimensions, $$\frac{d}{2}\log_2 \frac{2|\Sigma_{W|Y^i}|^{\frac{1}{d}}}{c_d} - d \leq h_i(W) \leq \frac{d}{2}\log_2\left(2\pi e|\Sigma_{W|Y^i}|^{\frac{1}{d}}\right),$$

where $c_d = (3^2 d^2)(4\sqrt{2}(d+2))$. This relationship between MSE, posterior volume, and posterior entropy suggests a strategy of selecting queries that minimize the posterior entropy after each query. Since the actual user response is unknown at the time of query selection, the expected posterior entropy after a response is made can be minimized, i.e., $\mathbb{E}_{y_{i+1}}[h_{i+1}(W)|y^i]$. Using a standard result from information theory, $\mathbb{E}_{y_i}[h_i(W)|y^{i-1}] = h_{i-1}(W) - I(W;Y_i|y^{i-1})$, where $I(W;Y_i|y^{i-1})$ is the "mutual information" between the location of the unknown user point and the user response, conditioned on previous responses. Examining this identity, it can be observed that selecting queries that minimize the expected posterior entropy is equivalent to selecting queries that maximize the mutual information between the user point and the user response, referred to herein as the information gain.

The lemma above can also be used to provide the performance boundaries for query selection via information gain maximization. For any user point estimate given by $\widehat{W}_i$ after i quires, the MSE (averaged over user points and query responses) for any selection strategy is bounded by $$\mathbb{E}_{W,Y^i}\|W - \widehat{W}_i\|_2^2 \geq \frac{d 2^{-2\frac{i}{d}}}{2\pi e}.$$

This result implies that the best rate of decrease in MSE one can hope for is exponential in the number of queries and slows down in a matter inversely proportional to the dimension, indicating quicker possible preference convergence in settings with lower dimensional embeddings. To estimate the information gain of a query, one can use the symmetry of mutual information to write the following Equations 4-7:

$I(W;Y_i|y^{i-1}) = H(Y_i|y^{i-1}) - H(Y_i|W,y^{i-1})$    Equation 4

$H(Y_i|y^{i-1}) = -\sum_{Y_i \in \{0,1\}} p(Y_i|y^{i-1})\log_2 p(Y_i|y^{i-1})$    Equation 5

$H(Y_i|w,y^{i-1}) = -\sum_{Y_i \in \{0,1\}} p(Y_i|w)\log_2 p(Y_i|w)$    Equation 6

$H(Y_i|W,y^{i-1}) = \mathbb{E}_{W|y^{i-1}}[H(Y_i|W,y^{i-1})]$.    Equation 7

Unlike the greedy MSE and posterior volume minimization strategies, information gain estimation only requires a single batch of posterior samples at each round of query selection, which is used to estimate the discrete entropy quantities in Equations 4-7. This results in a computational cost of O (dSM) for selecting each query, which is more computationally feasible than the previous methods described, yet it still can be prohibitive for highly accurate information gain estimates over a large pool of candidate pairs.

As described above, the present systems and methods describe multiple query-selection algorithms (i.e., an equiprobable, max-variance scheme and a mean cut, max-variance scheme) for pairwise search that automatically select the most informative pairs by directly modeling redundancy and noise in user responses. The systems and methods also mimic the action of maximizing information gain while being more analytically and computationally tractable. The equiprobable, max-variance scheme provides refined upper and lower bounds on the number of queries needed to shrink the posterior to a desired volume. The mean cut, max-variance scheme benefits from reduced computational complexity while still remaining theoretically coupled to maximizing information gain.

Equiprobable, Max-Variance

To illustrate the following approach of approximation for information gain maximization, the example where arbitrary pairs of items can be generated (unconstrained to a given dataset), resulting in a bisecting hyperplane parameterized by $(a_i, b_i)$, can be used. In practice, such queries might correspond to the generation of synthetic items via tools such as generative adversarial networks. With this freedom, an equiprobable query strategy can be developed where $b_i$ is selected so that each item in the query will be chosen by the user with probability ½. This strategy is motivated by the fact that the information gain of query i is upper bounded by $H(Y_i | \mathcal{Y}^{i-1})$, which is maximized if and only if the response probability is equiprobable. To motivate the selection of query hyperplane directions, a query's projected variance, denoted as $\sigma_i^2$, can be defined as the variance of the posterior marginal in the direction of a query's hyperplane, i.e., $\sigma_i^2 = \alpha_i^T \Sigma_{W|y^{i-1}} \alpha_i$. This corresponds to a measure of how far away the user point is from the hyperplane query, in expectation over the posterior distribution.

With this notation, the following lower bound on information gain for equiprobable queries can be provided. For any "equiprobable" query scheme with noise constant $k_i$ and projected variance $\sigma_i^2$, for any choice of constant $0 \leq c \leq 1$, then $$I(W; Y_i | y^{i-1}) \geq \left(1 - h_b\left(f\left(\frac{ck_i \sigma_i}{2}\right)\right)\right)(1-c) =: L_{c,k_i}(\sigma_i) \quad \text{Equation 8}$$

where $h_b(p) = -p\log_2 p - (1-p)\log_2(1-p)$. This lower bound is monotonically increasing with $k_i \sigma_i$ and achieves a maximum information gain of 1 bit at $k_i \to \infty$. This suggests choosing $a_i$ that maximize projected variance in addition to selecting $b_i$ according to the equiprobable strategy. The selection of equiprobable queries in the direction of largest projected variance is referred to herein as the equiprobable-max-variance scheme, or EPMV for short. The primary result concerns the expected number of comparisons (or query complexity) sufficient to reduce the posterior volume below a specified threshold set a priori, using EPMV.

The following theorem (Theorem 1) is for the EPMV query scheme with each selected query satisfying $k_i \|a_i\| \geq k_{min}$ for some constant $k_{min} > 0$. Considering the stopping time $$T_\varepsilon = \min\left\{i : |\Sigma_{W|Y^i}|^{\frac{1}{d}} < \varepsilon\right\}$$

for stopping threshold $\varepsilon > 0$.

For $\tau_1 = \frac{d}{2}\log_2\left(\frac{1}{2\pi e \varepsilon}\right)$ and $\tau_2 = \frac{d}{2}\log_2\left(\frac{c_d}{2\varepsilon} + d\right)$, one has $$\tau_1 \leq E[T_\varepsilon] \leq \tau_2 + \frac{\tau_2 + 1}{l(\tau_2)} - \frac{1}{l(\tau_2)}\int_0^{\tau_2} l(x)dx$$

where $$l(x) = L_{c,k_{min}}\left(\frac{2^{\frac{-x}{d}}}{\sqrt{2\pi e}}\right)$$

for any constant $0 \leq c \leq 1$ as defined in Equation 8. The lower bound is true for any query selection scheme.

The following theorem (Theorem 2) presents a looser upper bound. The EPMV scheme above, under the same assumption as Theorem 1 above, satisfies $$\mathbb{E}[T_\varepsilon] = O\left(d\log\frac{1}{\varepsilon} + \left(\frac{1}{\varepsilon k_{min}^2}\right)d\log\frac{1}{\varepsilon}\right).$$

Furthermore, for any query scheme, $$\mathbb{E}[T_\varepsilon] = \Omega\left(d\log\frac{1}{\varepsilon}\right).$$

This result has a favorable dependence on the dimension d, and the upper bound can be interpreted as a blend between two rates, one of which matches that of the generic lower bound. The second term in the upper bound provides some evidence that the ability to recover w worsens as $k_{min}$ decreases. This is intuitively unsurprising since small $k_{min}$ corresponds to the case where queries are very noisy.

For asymptotically large $k_b$, the following corollary is presented. In the noiseless setting ($k_{min} \to \infty$), EPMV can have optimal expected stopping time complexity for posterior volume stopping. When $k_{min} \to \infty$, from Theorem 2

$$\mathbb{E}[T_\varepsilon] = O\left(d\log\frac{1}{\varepsilon}\right);$$

for any scheme, $$\mathbb{E}[T_\varepsilon] = \Omega\left(d\log\frac{1}{\varepsilon}\right).$$

Taken together, these results suggest that EPMV is optimal with respect to posterior volume minimization up to a penalty term which decreases to zero for large noise constants.

While the EPMV described herein is derived under the assumption of arbitrary hyperplane queries, depending on the application, a pair can be selected from a fixed pool of items in a single given dataset. For this purpose, the systems and methods for EPMV described herein can use a metric for any candidate pair that, when maximized over all pairs in a pool, approximates the behavior of EPMV. For a pair with items p and q, in the item pool $\mathcal{P}$, let $a_{pq} = 2(p-q)$ and $b_{pq} = \|p\|^2 - \|q\|\mu^2$ denote the weights and threshold parametrizing the bisecting hyperplane. A pair can be chosen that maximizes the utility function) for some $\lambda > 0$ $$\eta_1(p, q; \lambda) = k_{pq}\sqrt{a_{pq}^T \Sigma_{W|Y^{i-1}} a_{pq}} - \lambda\left|\hat{p}_1 - \frac{1}{2}\right| \quad \text{Equation 9}$$

and $\hat{p}_1 = P(Y_i=1|Y^{i-1}) = \mathbb{E}_{W|y^{i-1}}[f(k_{pg}(a_{pq}^T W - b_{pq}))]$. This has the effect of selecting queries which are close to equiprobable and align with the direction of largest variance, weighted by $k_{pq}$ to prefer higher fidelity queries. While $\Sigma_{W|y^{i-1}}$ can be estimated once from a batch of posterior samples, $\hat{p}_1$ may require estimation for each candidate pair, resulting in a computational cost of O (dSM). The following strategy, therefore, approximates EPMV while further reducing the computational costs.

Mean-Cut, Max-Variance

Another system and method for increasing information gain is a mean-cut strategy, where $b_i$ can be selected such that the query hyperplane passes through the posterior mean, i.e., $a_i^T \mathbb{E}[W|Y^{i-1}] - b_i = 0$. For such a strategy, the following system can be employed. For mean-cut queries with noise constant $k_i$, and projected variance $\sigma_i^2$, then $$\left| p(Y_i | y^{i-1}) - \frac{1}{2} \right| \leq \frac{e-2}{2e} + \frac{\ln 2}{k_i \sigma_i}$$

and $$I(W; Y_i | y^{i-1}) \geq h_b\left(\frac{1}{e} - \frac{\ln 2}{k_i \sigma_i}\right) - \frac{\pi^2 (\log_2 e)}{3 k_i \sigma_i}.$$

For large projected variances, it can be observed that $$\left| p(Y_i | y^{i-1}) - \frac{1}{2} \right| \lesssim 0.14.$$

In this setting, therefore, the mean-cut queries can be an approximation for equiprobable queries. Additionally, the lower bound to information gain is a monotonically increasing function of the projected variance. As $\sigma_i \to \infty$, this bound approaches $h_b(1/e) \approx 0.95$, which is nearly sharp since a query's information gain is upper bounded by 1 bit. This implies some correspondence between maximizing a query's information gain and maximizing the projected variance, as is the case for EPMV. Hence, the mean-cut, maximum variance queries (referred to herein as MCMV) and serves as an approximation to EPMV while still maximizing a lower bound on information gain.

For implementing MCMV over a fixed pool of pairs (rather than arbitrary hyperplanes), the orthogonal distance of each pair's hyperplane to the posterior mean can be calculated as $|a_{pq}^T \mathbb{E}[W|Y^{i-1}] - b_{pq}|/\|a_{pq}\|_2$, and the projected variance as $a_{pq}^T \Sigma_{W|y^{i-1}} a_{pq}$. A pair that maximizes the following function can be chosen (tuned to $\lambda > 0$), which is a balance between minimizing distance to the posterior mean, maximizing noise constant, and maximizing projected variance:

$$\eta_2(p, q; \lambda) k_{pq} = \sqrt{a_{pq}^T \Sigma_{W|y^{i-1}} a_{pq}} - \lambda \frac{|a_{pq}^T \mathbb{E}[W|Y^{i-1}] - b_{pq}|}{\|a_{pq}\|_2}. \quad \text{Equation 10}$$

This is a beneficial strategy from a computational standpoint since the posterior mean $\mathbb{E}[W|Y^{i-1}]$ and covariance $\Sigma_{W|y^{i-1}}$ can be estimated once in O $(d^2 S)$ computations, and subsequent calculation of the hyperplane distance from mean and projected variance requires only O $(d^2)$ computations per pair. Overall, this particular implementation of MCMV strategy has a computational complexity of O $(d^2(S+M))$, which can scale more favorably than the information gain maximization and EPMV strategies described above.

Algorithm 1, listed below, is an example unification of information gain (referred to herein as InfoGain), EPMV, and MCMV query selection methods under a single framework. At each round of querying, a pair is selected that maximizes a utility function $\eta(p, q)$ over a downsampled pool of candidates pairs, with $\eta_0(p,q) \equiv I(W; Y_i|y^{i-1})$ for InfoGain, and $\eta_1$ from Equation 9 and $\eta_2$ from Equation 10 denoting the utility functions of EPMV and MCMV, respectively. A batch of posterior samples denoted by $\tilde{W}$ as an input to $\eta_0$ and $\eta_1$ can be included to emphasize their dependence on posterior sampling, and mean and covariance inputs can be added to $\eta_2$ since once these are estimated, MCMV requires no additional samples to select pairs.

---

Algorithm 1

Input: item set $\mathcal{X}$, parameters S, β, λ
  $\mathcal{P} \leftarrow$ set of all pairwise queries from items in $\mathcal{X}$
  $\mathcal{P}_\beta \leftarrow$ uniformly downsample $\mathcal{P}$ at rate $0 < \beta \leq 1$
  $\tilde{W}_0, \mu_0, \Sigma_0 \leftarrow$ initialize from samples of prior
  for i = 1 to T do InfoGain  $p_i, q_i \leftarrow \underset{p,q \in \mathcal{P}_\beta}{\mathrm{argmax}}\ \eta_0(p, q; \tilde{W}_{i-1})$ EPMV: $p_i, q_i \leftarrow \underset{p,q \in \mathcal{P}_\beta}{\mathrm{argmax}}\ \eta_1(p, q; \lambda, \tilde{W}_{i-1})$ MCMV: $p_i, q_i \leftarrow \underset{p,q \in \mathcal{P}_\beta}{\mathrm{argmax}}\ \eta_2(p, q; \lambda, \mu_{i-1}, \Sigma_{i-1})$ $y_i \leftarrow$ PairedComparison($p_i, q_i$)
  $y^i \leftarrow [y_i, y^{i-1}]$
  $\tilde{W}_i \leftarrow$ batch of S samples from posterior $W | Y^i$
  $\mu_i, \Sigma_i \leftarrow$ Mean($\tilde{W}_i$), Covariance($\tilde{W}_i$)
  $\hat{W}_i \leftarrow \mu_i$
  end for
Output: user point estimate $\hat{W}_T$

---

Testing InfoGain, EPMV, and MCMV

The following results demonstrate the effectiveness of various embodiments of the systems and methods described herein for preference embedding and search. An embedding from a set of training user-responses consisting of multidimensional item points was constructed. The pairwise search methods were simulated over randomly generated preference points and user responses. The dataset comprised 958,479 publicly available triplet comparisons assessing relative similarity among 10,000 food items.

The InfoGain, EPMV, and MCMV as described above and in Algorithm 1 were compared against baseline models including (1) random, (2) GaussCloud-Q, and (3) ActRank-Q. The "random" method comprises selecting pairs uniformly at random and user preferences are estimated as the posterior mean. GaussCloud-Q comprises selecting pairs to approximate a Gaussian point cloud around the preference estimate that shrinks dyadically over Q stages. ActRank-Q comprises selecting pairs that intersect a feasible region of preference points and queried Q times; a majority vote is then taken to determine a single response, which is used with the pair hyperplane to further constrain the feasible set. In each simulation set, a point W was generated uniformly at random from the hypercube $[-1, 1]^d$ and paired comparisons were collected using the item points in the embedding according to the methods described herein.

The response probability of each observation follows Equation 1 (referred to herein as the "logistic" model), using each of the three schemes for choosing $k_{pq}$ described above in example parameters (K1)-(K3). In each scheme, the value of $k_0$ was optimized over the set of training triplets via maximum-likelihood estimation according to the logistic model. The Stan Modeling Language was used to generate posterior samples, when required.

Note that unlike GaussCloud-R and ActRank-R, the random, InfoGain, EPMV, and MCMV methods directly exploit a user response model in the selection of pairs and estimation of preference points, which can be advantageous when a good model of user responses is available. Each method in this matched scenario is empirically tested, where the noise type (logistic) and the model for $k_{pq}$ (e.g., "constant," "normalized," or "decaying") are revealed to the algorithms. A mismatched scenario is also tested by generating response noise according to a non-logistic response model while the methods above continue to calculate the posterior as if the responses were logistic. Specifically, responses are generated according to a "Gaussian" model $$y_i = \text{sign}(k_{pq}(a_i^T w - b_i) + Z) \quad Z \sim \mathcal{N}(0,1)$$

where $k_0$ and the model for $k_{pq}$ are selected using the maximum-likelihood on the training triplets.

Figure 2A:
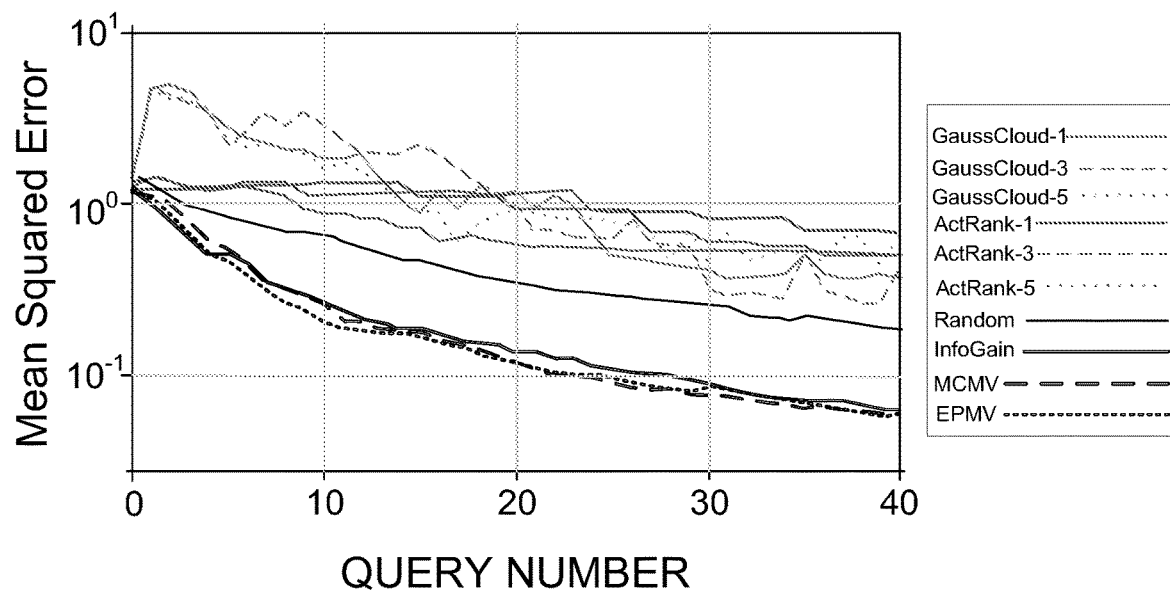
FIGS. 2A-2D are graphs of the performance metrics of preference embedding systems, according to some embodiments of the present disclosure.
Figure 2B:
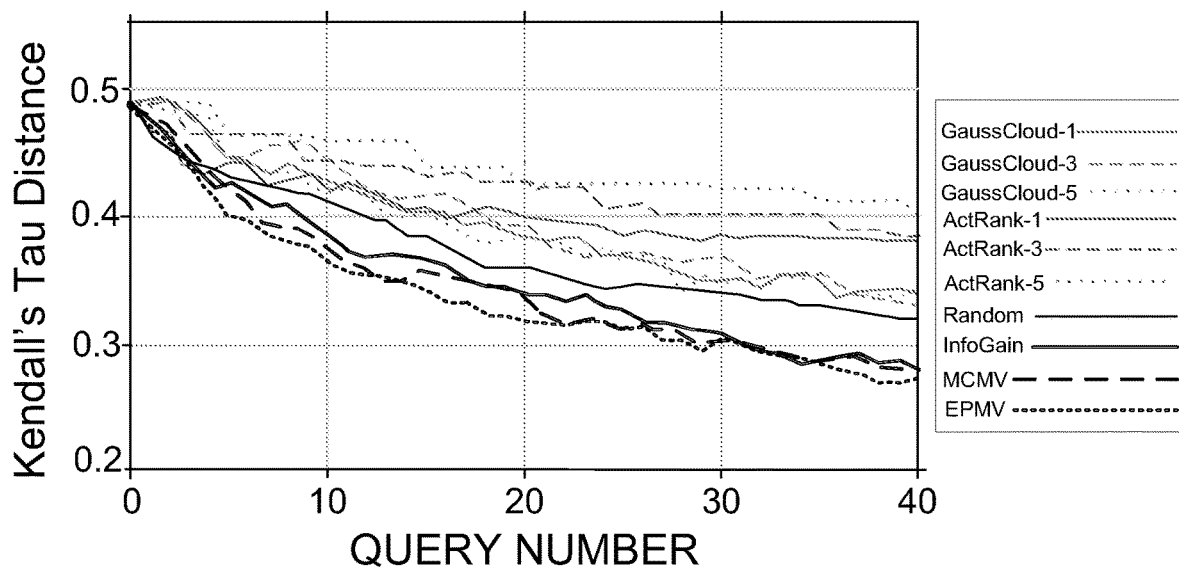
Figure 2C:
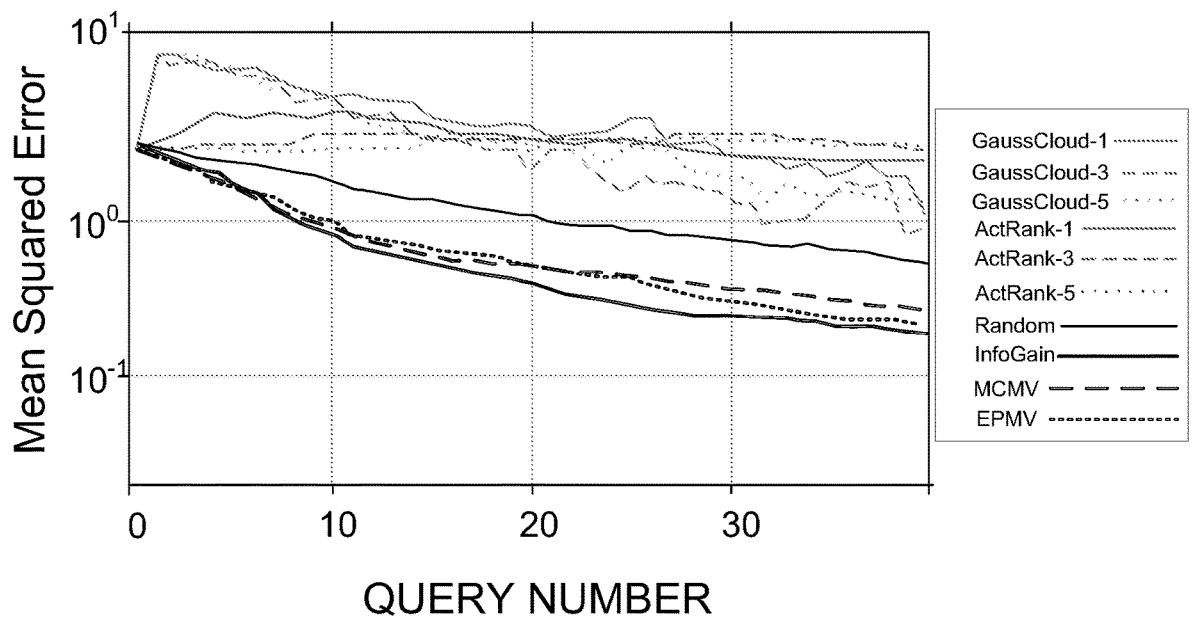
Figure 2D:
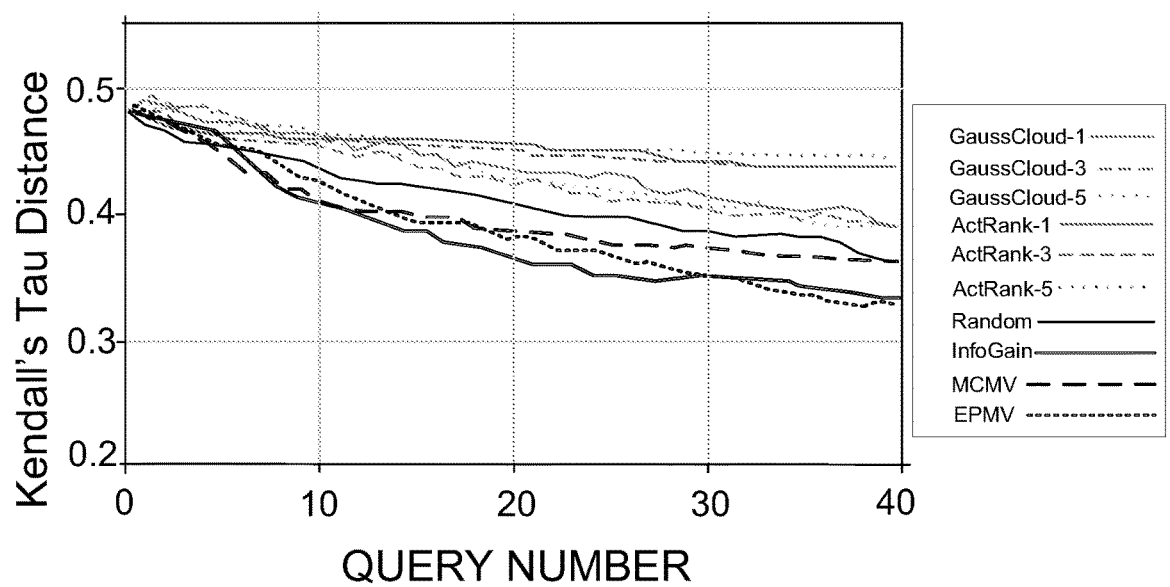

FIGS. 2A-2D are graphs of the performance metrics of estimating over 40 queries, averaged over number of trials per method. FIG. 2A is a graph showing estimation error for matched logistic noise, where d=4; FIG. 2B is a graph ranking performance for matched logistic noise, where d=4; FIG. 2C is a graph showing estimation error for mismatched Gaussian noise, where d=7; and FIG. 2D is a graph ranking performance for mismatched Gaussian noise, where d=7. FIGS. 2A and 2C plot the MSE of each method's estimate with respect to the ground truth location over the course of a pairwise search run. In FIG. 2A, the EPMV and MCMV methods outperform random, ActRank-Q, and Gauss-Cloud-Q for multiple values of Q by a substantial margin. Furthermore, both EPMV and MCMV strategies performed similarly to InfoGain, corroborating their design as information maximization approximations. Note that random outperforms the other baseline methods, supporting the use of Bayesian estimation in this setting (separately from the task of active query selection). As shown in FIG. 2C, although mismatched noise results in decreased performance overall, the same relative trends between the methods as in FIG. 2A are evident.

Implementing the Systems and Methods for Preference Embedding and Search

Figure 3:
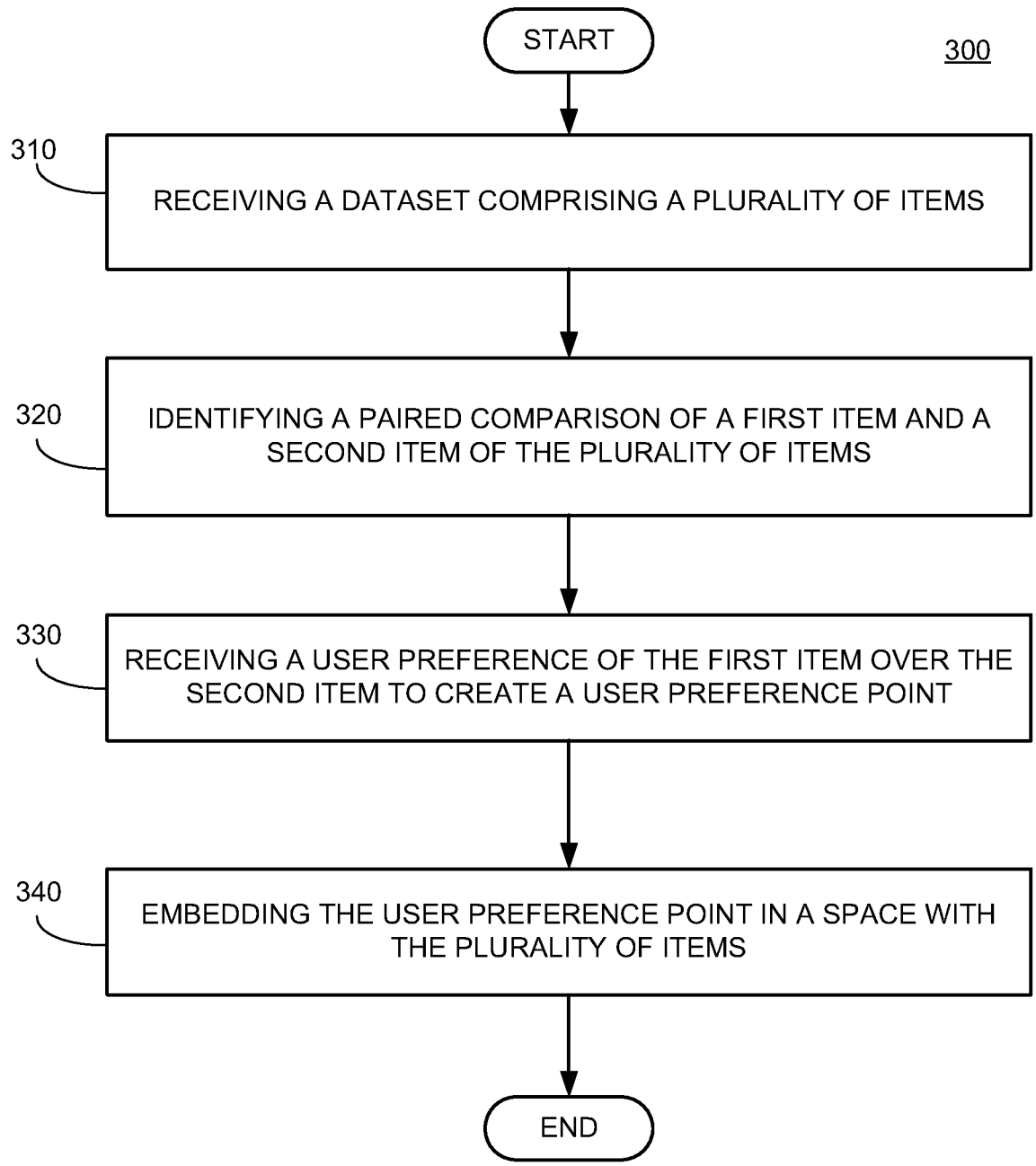
FIG. 3 is a flowchart illustrating an example process for embedding a user preference in a Euclidean space, according to some embodiments of the present disclosure.

FIG. 3 is a flowchart illustrating an example process 300 for embedding a user preference in a Euclidean space, according to some embodiments of the present disclosure. The process 300 can be performed, for example, by the systems described hereinafter, including, for example, the example computing system architecture 700 of FIG. 7.

Process 300 can begin at block 310, which can include receiving a dataset. The dataset can include a plurality of items. The dataset can be received at an input/output interface (e.g., a keyboard interface 706, a display interface 704, a presence-sensitive input interface 708, a network connection interface 712, a camera interface 714, or a sound interface 716 like those described in FIG. 7 or another input/output interface). In some examples, the dataset can be received from a training set of triplet comparison queries, including but not limited to triplet comparisons from a Crowd Kernel Learning technique or a Stochastic Triplet Embedding technique. The dataset can be received from a training set comprising a plurality of tuple comparisons.

At block 320, process 300 can include identifying a paired comparison of a first item and a second item of the plurality of items. The identification can be completed, for example, by a processor (for example the central processing unit 702 described in FIG. 7 or another processor). The paired comparison can be identified, for example, by actively selecting informative queries. As would be understood by one of ordinary skill in light of the present disclosure, informative queries can be understood as a query whose response (or the user's response to that query) is not obvious (i.e., highly predictable before-hand) but is not inherently ambiguous. In addition, or as an alternative, the paired comparison can be identified by ignoring, or deselecting, ambiguous paired comparisons in the plurality of items (e.g., pairs where the user selection is random). This ambiguity can be the result of noise, as described herein.

The identification of the paired comparison can be facilitated by any of the methods outlined herein. For example, the processor may use one or more of an InfoGain scheme, an equiprobable, max-variance scheme, and a mean cut, max-variance scheme to identify the paired comparisons by reducing the obvious and/or noisy paired comparisons in block 320. A utility metric may be used to assesses how "informative" any candidate query is, and the candidate query determined to be the most information by this metric is actively selected.

At block 330, process 300 can include receiving a user preference of the first item over the second item to create a user preference point. The user preference can be received from a user device, which can be similar to user device described below with reference to FIG. 8. At block 340, the process can include embedding the user preference point in a space with the plurality of items. The user preference point and the plurality of items (or objects) can be embedded in a space, for example a Euclidean space, such that a distance between the user preference point and each item of the plurality of items is indicative of the user preference of the plurality of items.

In some cases, the plurality of items may be initially positioned in the space. Furthermore, if a user preference point already exists in the space (e.g., either through an initialization of the preference point before any queries are made or a previous embedding of the preference point in space), the user preference and the plurality of items can be embedded in the space such that a distance between the user preference point and each item of the plurality of items can be indicative of the user preference of the plurality of items. The embedding of the user preference point can, therefore, operate to re-embedded the user preference point in the space at block 340 to reposition the user preference point in accordance to the response.

As will be understood by one of ordinary skill in light of the present disclosure, process 300 can be substantially repeated to reposition the user preference based on a result of a subsequent identified paired comparison. For example, a second paired comparison can be identified and transmitted to the oracle. After receiving the oracle's preference from the second paired comparison, the user preference can be re-embedded in the space to reposition the user preference point in accordance to the new (i.e., second) response preference. By re-embedding the user preference within the plurality of items, the system can change the Euclidean space to accurately indicate the user's changing preference after a given query. This adaptive embedding facilitates subsequent searches of the dataset, assists in identifying the user's exact preference point, and improves query selection. For example, the processes of identifying the paired comparison to create subsequent queries can increase the "mutual information" between the location of the unknown user preference point and the user response. This can enable searching the dataset to identify a third item that is closest the user's actual preference. The proximity of a third item to the user preference point can, for example, indicate the user prefers the third item.

Active Ordinal Querying for Tuplewise Similarity Learning

The systems and methods described above are useful for embedding user preferences from pairwise searches, i.e., comparing two body objects or comparing two body objects to one head object. In some scenarios, however, comparing more than two objects may be beneficial, as comparing more than two objects at once enables the dataset to be embedded more efficiently than possible in the related art.

The present similarity learning methods modify and expand previous methods of embedding objects according to similarity within a dataset. In related art systems, for example, to construct such an embedding for a given set of objects, queries that capture the similarity statistics between the objects in question must be made to human experts, or oracles. Typically, the oracle receives a triplet of objects including a "head" (similar to the head described above) and two "body" objects, and is asked to rank the body objects in terms of most similar to the head object. This process, known as relative similarity query, is useful because it gathers object similarity information using only object identifiers rather than predetermined features or attributes, enabling similarity learning methods to be applied to any collection of uniquely identifiable objects. In contrast, if a head object was not specified, an oracle would need to use a feature-based criterion for ranking the object set, which is not viable in many applications of interest (e.g., learning human preferences).

Typical similarity queries come in the form of triplet comparisons (i.e., "is object A more similar to object B or C?"). As can be seen, this is similar to preference learning described above, and the related art systems and methods can be used to improve upon that type of similarity learning (one head "a," and two bodies "b" and "c"). However, similarity learning can benefit from extra context derived from larger sets of body objects (e.g., tuple), and this context can create a more-properly embedded dataset in fewer queries.

The present systems and methods for active ordinal querying for tuplewise similarity learning modify the aforementioned preference embedding schemes for larger rankings. For example, the systems and methods extend the preference-based methods to larger rank orderings of tuples of k body objects to gather more information at once for similarity learning. This query type takes the form "rank objects $b_1$ through $b_{k-1}$ according to their similarity to object a." The use of this query type is motivated by the fact that comparing multiple objects simultaneously provides increased context for a human expert, creating additional nuance in the query result.

Figure 4A:
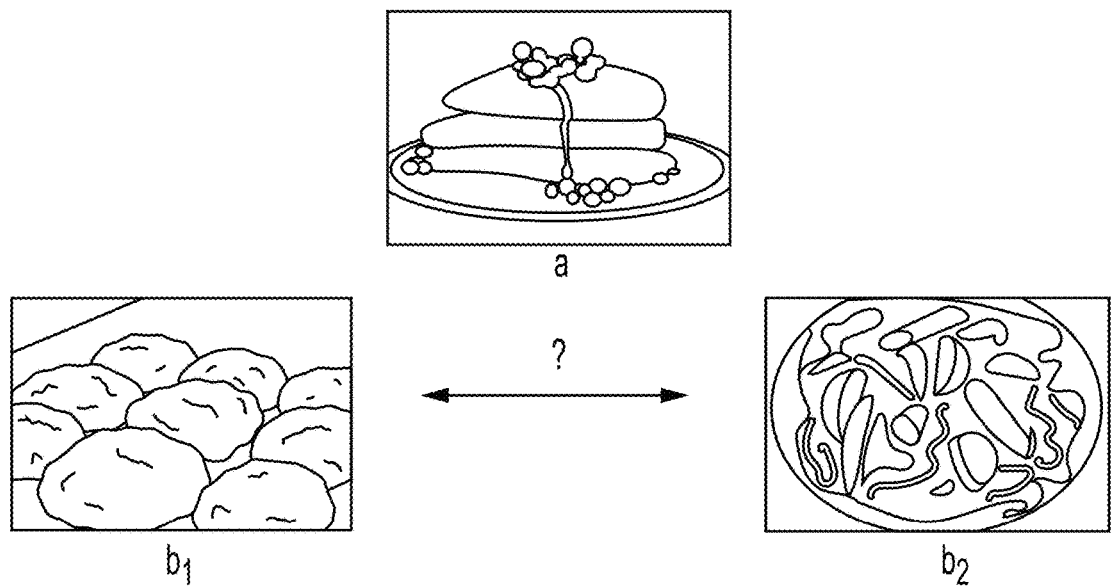
FIGS. 4A and 4B are images depicting the use of tuple-wise similarity schemes for increasing context of a comparison, according to some embodiments of the present disclosure.
Figure 4B:
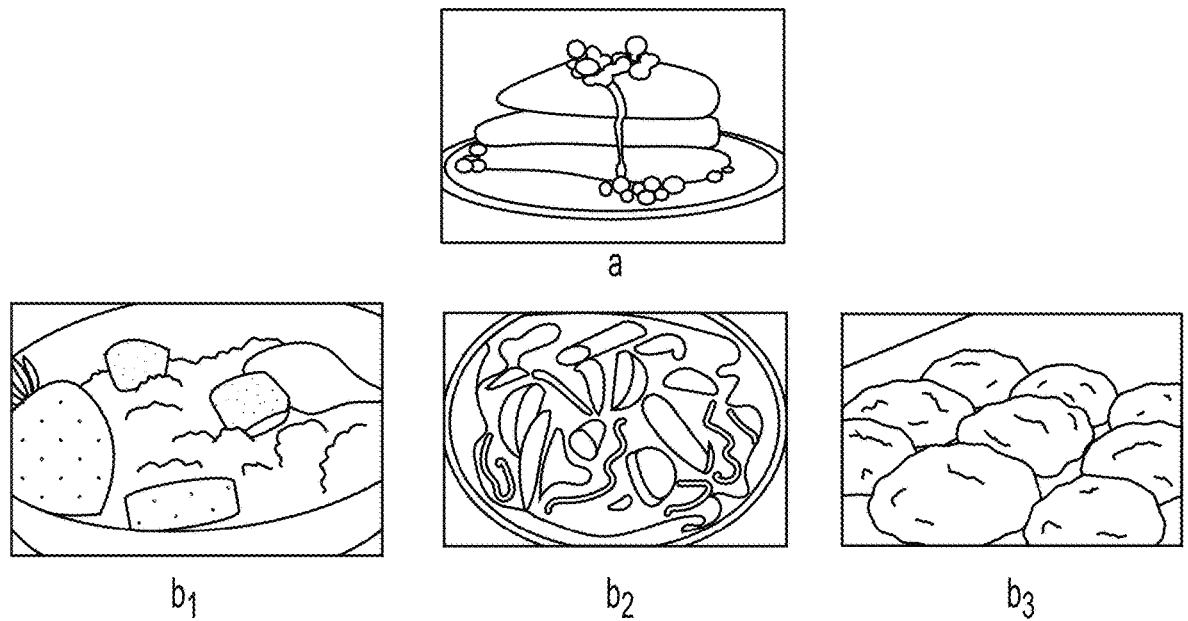

FIGS. 4A and 4B are images depicting the use of tuplewise similarity schemes for increasing context of the comparison. In FIG. 4A, it is ambiguous which item should be chosen as more similar to the pancakes ("a"), because, although the cookie ("$b_1$") is also a sweet, the salad ("$b_2$") has fruit on top. Now, consider adding one more item to create a larger tuple, as shown in FIG. 4B. The oatmeal with strawberries ("$b_1$") is arguably the most similar to the pancakes ("a"), since they both have fruit on top and are breakfast items. The salad ("$b_2$") would then logically follow this sequence since it has fruit on top, followed by the cookie ("$b_3$") since it is the only item remaining. Consider another example using animals. An oracle may be asked to rank a wolf and a cat in terms of similarity to a dog (head object). If these two items were ranked, it would be unclear how the oracle is ranking: is the ranking based on which looks more similar to the dog, is the ranking based on what is considered a pet, etc.? Alternatively, consider if the oracle is asked to rank a wolf, a cat, and a guinea pig in terms of similarity to a dog (head object). This tuple size of 4 provides more context than when there are only two comparisons. If the oracle ranks the wolf first and the guinea pig last, the oracle is likely ranking based on similar appearance. If the oracle ranks the cat first and the wolf last, the oracle is likely ranking based on similarities as pets. Existing similarity-learning methods do not provide this type of context, as previous methods do not adaptively select relative comparisons with respect to a head object for general tuple sizes ($k \geq 3$) in the context of similarity learning.

Adaptively selecting a tuplewise query from a plurality of objects can be formulated as follows: for a dataset $\chi$ of N objects, assume that there exists a d-dimensional vector of embedding coordinates for each object which are concentrated in columns as matrix $M \in \mathbb{R}^{d \times N}$. The "similarity matrix" corresponding to M is given by $K=M^T M$, which implies an N×N matrix D of distances between the objects in $\chi$. Specifically, the squared distance between the ith and jth objects in the dataset is given by $D_{i,j}^2 = K_{i,i} - 2K_{i,j} + K_{j,j}$. These distances can be assumed to be consistent in expectation with similarity comparisons from an oracle (e.g., human expert or crowd) such that similar objects are closer and dissimilar objects are farther apart. Since relative similarity comparisons between tuples of objects inform their relative embedding distances rather than their absolute coordinates, the objective can be to learn similarity matrix K rather than M, which can be recovered from K up to a change in basis.

A tuplewise oracle query at time step n is composed of a "body" of objects $B^n = \{b_1^n, b_1^n, \ldots b_{k-1}^n\}$ which the oracle ranks by similarity with respect to some "head" object $a_n$. Letting $Q^n = \{a_n\} \cup B^n$ denote the nth posed tuple, the oracle's ranking can be denoted as $R(Q_n) = \{R_1(Q_n), R_2(Q_n), \ldots R_{k-1}(Q_n)\}$ which is a permutation of $B^n$ such that $R_1(Q_n) \prec R_2(Q_n) \ldots \prec R_{k-1}(Q_n)$ wherein $b_i \prec b_j$ indicates the oracle ranks object $b_i$ as more similar to $a_n$ than object $b_j$. Since the oracle can be assumed stochastic, $R(Q_n)$ is a random permutation of $B^n$ governed by a distribution that is assumed to depend on K. This assumed dependence is natural because oracle consistency is likely coupled with notions of object similarity and, therefore, with distances between the objects in M. The actual recorded oracle ranking is a random variate of $R(Q_n)$ denoted as $r(Q_n)$. Letting $r^n = \{r(Q_1), r(Q_2), \ldots r(Q_n)\}$, $\hat{K}^n$ can be defined as an estimate of K learned from previous rankings $r^n$, with corresponding distance matrix $\hat{D}^n$.

Suppose that tuples $W_1, W_2, \ldots Q_{n-1}$ have been posed as queries to the oracle with corresponding ranking responses $r^{n-1}$, and consider a Bayes optimal approach where after the nth query the similarity matrix is estimated as the maximum a-posteriori (MAP) estimator over a similarity matrix posterior distribution given by $f(K|r^n)$, i.e., $\hat{K}_n = \arg\max_K f(K|r^n)$. To choose the query $Q_n$, a reasonable objective can be to select a query that maximizes the achieved posterior value of the resulting MAP estimator (or equivalently one that maximizes the achieved logarithm of the posterior), corresponding to a higher level of confidence in the estimate. However, because the oracle response $r(Q_n)$ is unknown before a query is issued, the resulting maximized posterior value is unknown. Instead, a more reasonable objective can include selecting a query that maximizes the expected value over the posterior of $R(Q_n)$. This can be stated as:

$$\underset{Q_n}{\operatorname{argmax}} \, \mathbb{E}_{R(Q_n)} \left[ \max_K \log f(K | R(Q_n), r^{n-1}) \, \big| \, r^{n-1} \right]$$

In practice, this optimization infeasible since each expectation involves the calculation of several MAP estimates. Noting that maximization is lower bounded by expectation, this optimization can be relaxed by replacing the maximization over K with an expectation over its posterior distribution given $R(Q_n)$ and $r^{n-1}$, resulting in a feasible maximization of a lower bound given by Equation 11:

$$\underset{Q_n}{\operatorname{argmax}} - h(K | R(Q_n), r^{n-1}), \quad \text{Equation 11}$$

where $h(K|R(Q_n), r^{n-1})$ denotes conditional differential entropy. The mutual information between K and $R(Q_n)$ given $r^{n-1}$ can be defined by:

$$I(K; R(Q_n)|r^{n-1}) = h(K|r^{n-1}) - h(K|R(Q_n), r^{n-1}),$$

where it is noted that the second term is equal to Equation 11 while the first term does not depend on the choice of $Q_n$. Thus, maximizing Equation 11 over $Q_n$ is equivalent to maximizing $I(K, R(Q_n)|r^{n-1})$. Therefore, it is possible to actively select tuples that maximize mutual information as a means of greedily maximizing a lower bound on the log-posterior achieved by a MAP estimator, corresponding to a high estimator confidence.

Calculating Equation 11 for a candidate tuple can be an expensive process, however, that may involve estimating the differential entropy of a combinatorially large number of posterior distributions, since the expectation with respect to $R(Q_n)$ is taken over (k−1)! possible rankings. Instead, the symmetry of mutual information can be leveraged to write the equivalent objective:

$$\underset{Q_n}{\operatorname{argmax}} H(R(Q_n) | r^{n-1}) - H(R(Q_n) | K, r^{n-1}) \quad \text{Equation 12}$$

where $H(\bullet|\bullet)$ denotes conditional entropy of a discrete random variable. Estimating Equation 12 for a candidate tuple only involves averaging ranking entropy over a single posterior $f(K|r^{n-1})$, regardless of the value of k. This insight enables efficient estimation of mutual information for a candidate tuple over a single batch of Monte Carlo samples, rather than having to sample from (k−1)! posteriors.

By interpreting entropy of discrete random variables as a measure of uncertainty, this form of mutual information maximization also provides two additional benefits. The first entropy term in Equation 12 prefers tuples whose rankings are uncertain, preventing queries from being wasted on predictable or redundant responses. Meanwhile, the second entropy term discourages tuples that have high expected uncertainty when conditioned on K; this prevents the selection of tuples that, even if K were somehow revealed, would still have uncertain rankings. Such queries can be inherently ambiguous and uninformative to the embedding. Thus, maximizing mutual information optimizes the balance between these two measures of uncertainty and, therefore, prefers queries that are unknown to the learner but that can still be answered consistently by the oracle.

The following describes example methods for estimating mutual information. To tractably estimate the entropy terms in Equation 12 for a candidate tuple, the following simplifying assumptions can be employed concerning the joint statistics of the query sequence and the embedding that allow for efficient Monte Carlo sampling:

(A1) As is common in active learning settings, it can be assumed that each query response $R(Q_n)$ is statistically independent of previous responses $r^{n-1}$, when conditioned on K.

(A2) The distribution of $R(Q_n)$ conditioned on K is only dependent on the distances between $a_n$ and the objects in $b_n$, notated as set $D_{Q_n} := \{D_{a_n,b} : b \in B\}$. This direct dependence of tuple ranking probabilities on inter-object distances is rooted in the fact that the distance relationships in the embedding are assumed to capture oracle response behavior. Furthermore, this conditional independence of $R(Q_n)$ from objects $\chi \notin Q_n$ is prevalent in probabilistic ranking literature. A reasonable ranking probability model that satisfies this assumption is described in the next section.

(A3) D is conditionally independent of $r^{n-1}$, given $\hat{D}^{n-1}$. This assumption is reasonable because embedding methods used to estimate $R^{n-1}$ (and subsequently $\hat{D}^{n-1}$) are designed such that distances in the estimated embedding preserve the response history contained in $r^{n-1}$. In practice, it may be more convenient to model an embedding posterior distribution by conditioning on $\hat{D}^{n-1}$, learned from the previous responses $r^{n-1}$, rather than by conditioning on $r^{n-1}$ itself. This is in the same spirit of CKL, where the current embedding estimate is used to approximate a posterior distribution over points.

(A4) Conditioned on $\hat{D}^{n-1}$, the posterior distribution of $D_{Q_n}$ is normally distributed about the corresponding values in $\hat{D}_{Q_n}^{n-1}$, i.e., $D_{a_n,b}^{n-1} \approx \mathcal{N}(\hat{D}_{a_n,b}^{n-1}, \sigma_{n-1}^2)$ $\forall b \in B$, where $\sigma_{n-1}^2$ is a variance parameter. Imposing Gaussian distributions on inter-object distances is a recent approach to modeling uncertainty in ordinal embeddings that enables approximation of the distance posterior with a fixed batch of samples from a simple distribution. Furthermore, the combination of this model with (A2) means that one only needs to sample from the normal distributions corresponding to the objects in $Q_n$. The variance parameter $\sigma_{n-1}^2$ is chosen to be the sample variance of all entries in $\hat{D}^{n-1}$, which is a heuristic that introduces a source of variation that preserves the scale of the embedding.

Combining these assumptions with a slight abuse of notation by writing $H(X) = H(p(X))$ for a random variable X with probability mass function $p(X)$, and $\mathcal{N}_{Q_n}^{n-1}$ to represent normal distribution $\mathcal{N}(\hat{D}_{Q_n}^{n-1}, \sigma_{n-1}^2)$ then:

$$H(R(Q_n) \mid r^{n-1}) = H\left(\mathbb{E}_K[p(R(Q_n) \mid K, r^{n-1}) \mid r^{n-1}]\right)$$

$$= H\left(\mathbb{E}_K[p(R(Q_n) \mid K) \mid r^{n-1}]\right) \quad (A1)$$

$$= H\left(\mathbb{E}_{D_{Q_n}}[p(R(Q_n) \mid D_{Q_n}) \mid r^{n-1}]\right) \quad (A2)$$

$$= H\left(\mathbb{E}_{D_{Q_n}}\left[p(R(Q_n) \mid D_{Q_n}) \mid \hat{D}^{n-1}\right]\right) \quad (A3)$$

$$= H\left(\mathbb{E}_{D_{Q_n} \sim N_{Q_n}^{n-1}}[p(R(Q_n) \mid D_{Q_n})]\right) \quad (A4)$$

Similarly, $$H(R(Q_n) \mid K, r^{n-1}) = \mathbb{E}_{D_{Q_n} \sim N_{Q_n}^{n-1}}[H(p(R(Q_n) \mid D_{Q_n}))].$$

This formulation allows a fixed-sized batch of samples to be drawn and evaluated over, the size of which can be tuned based on real-time performance specifications. This enables a separation of computational budget and mutual information estimation accuracy from the size of the tuple query.

The following describes an example embedding technique for the present systems for similarity learning. In order to maximize the flexibility of the systems and methods, the embedding can be trained on the actively selected tuples by first decomposing a tuple ranking into k−2 constituent triplets defined by the set $\{R_i(Q_m) \prec R_{i+1}(Q_m) : 1 \le i \le k-2, m \le n\}$, and then learning an embedding from these triplets with any triplet ordinal embedding algorithm of choice. Since, as will be described in greater detail herein, the performance of examples of the present systems and methods was compared against CKL, the proposed embedding technique follows directly from the probabilistic multi-dimensional scaling (MDS) technique used by CKL so as to evaluate the effectiveness of the novel query selection strategies in a controlled setting.

The following describes a tuple response model. The following example technique is compatible with any tuple ranking that satisfies assumption (A2) above. However, since the triplet response model listed above in the probabilistic MDS formulation was used, combined with the need for a controlled test against CKL, the MDS model is extended to the tuplewise case as follows. The oracle's ranking is first decomposed into its constituent triplets, and then the following is applied for parameter μ>0:

$$p(R(Q_n) \mid D_{Q_n}) \propto \prod_{i=1}^{k-2} \frac{D_{a,R_{i+1}(Q_n)}^2 + \mu}{D_{a,R_i(Q_n)}^2 + D_{a,R_{i+1}(Q_n)}^2 + 2\mu}$$

This model corresponds to oracle behavior that ranks objects proportionally to the ratio of their distances with respect to a, such that closer (resp. farther) objects are more (resp. less) likely to be deemed similar.

The following adaptive algorithm, summarized in Algorithm 2, can be referred to herein as InfoTuple. Some initial set of randomly selected tuples are labeled to provide a reasonable initialization of the learned similarity matrix. This initialization is standardized across methods considered in the results below. Specifically, a "burn-in" period is used where $T_0$ random triplets are posed for each object a in object set χ, with a being the head of each query. Then, for each time step n, a similarity matrix $\hat{K}^{n-1}$ can be learned on the set of previous responses $r^{n-1}$ by using probabilistic MDS. To make a comparison to CKL, the CKL procedure is followed and a single tuple for each head a∈X is subsequently posed.

---

Algorithm 2

---

Require: object set χ, rate ω, sample size $N_f$, horizon T
$r^0 \leftarrow \emptyset$ initialize set of oracle responses
$\hat{K}^0 \leftarrow$ initialize embedding
for n = 1 to T do
    $\hat{D}^{n-1} \leftarrow$ calculate pairwise distances from $\hat{K}^{n-1}$ $$\sigma_{n-1}^2 \leftarrow \frac{1}{N^2} \Sigma_{d \in \hat{D}^{n-1}} \left(d - \frac{1}{N^2} \Sigma_{d \in \hat{D}^{n-1}} d\right)^2$$

for all α ∈ χ do
        β ← downsampled k − 1 sized bodies at rate ω
        for all B ∈ β do
            Q ← {α} ∪ B
            $D_s \sim \mathcal{N}(\hat{D}_Q^{n-1}, \sigma_{n-1}^2)$, drawn $N_f$ times $$I_B \leftarrow H\left(\sum_{D \in D_s} \frac{p(R(Q)(D))}{N_f}\right) - \sum_{D \in D_s} \frac{H(p(R(Q)(D)))}{N_f}$$

end for
        B ← arg max$_{B \in \beta}$ $I_B$
        r ← oracle ranks objects in B relative to α
        $r^n \leftarrow r^{n-1} \cup r$
    end for
    $\hat{K}^n \leftarrow$ probabilisticMDS($r^n$)
end for
Ensure: $\hat{K}^T$

---

It is possible to adaptively choose a with the present method by searching over both head and body objects for a maximally informative tuple. The body of each tuple, given some head a, can be chosen by uniformly downsampling the set of possible bodies and selecting the one that maximizes the mutual information, calculated using the aforementioned probability model in the estimation procedure. This highlights the importance of computational tractability in estimating mutual information, since for a fixed computing budget per selected query, less expensive mutual information estimation allows for more candidate bodies to be considered. For a tuple size of k, the run of an algorithm using that tuple size is denoted as InfoTuple-k hereinafter.

Testing the Active Ordinal Ordering for Tuplewise Similarity Learning

To evaluate algorithm performance in a controlled setting, a synthetic evaluation dataset was constructed by generating a point cloud drawn from a d-dimensional multivariate normal distribution. To simulate oracle responses for this dataset, the popular Plackett-Luce permutation model was used to sample a ranking for a given head and body. In this response model, each object in a tuple body is assigned a score according to a scoring function, which in the present case is based on the distance in the underlying space between each object and the head. For a given subset of body objects, the probability of an object being ranked as most similar to the head is its score divided by the scores of all objects in that subset, and each simulated oracle response can be generated by sequentially sampling objects without replacement from a tuple according to this model. This tested response model was chosen to differ from the one used to estimate mutual information in order to demonstrate the robustness of the method to mismatched noise models. This dataset was used to compare InfoTuple-3, InfoTuple-4, InfoTuple-5, CKL, Random-3, and Random-5 across noiseless, Gaussian, and Plackett-Luce oracles.

To demonstrate the broader applicability of the methods in real-world settings and evaluate the technique on perceptual similarity data, a large dataset of human responses to tuplewise queries was collected through Amazon Mechanical Turk. Retrieving 3000 food images from a dataset, 7000 users were presented with a total of 192,000 varying-size tuplewise queries chosen using Infotuple-3, InfoTuple-5, Random-3, and Random-5 as selection strategies across three repeated runs of each algorithm. Users were evaluated with one repeat query out of 25, and users who responded inconsistently to the repeat query were discarded. Query bodies were always shuffled when presented to minimize the impact of any possible order effect, and it was not found to be the case that there was any significant order effect in the human responses. Initial embeddings for each of these methods were trained on 5,000 triplet queries.

Figure 5A:
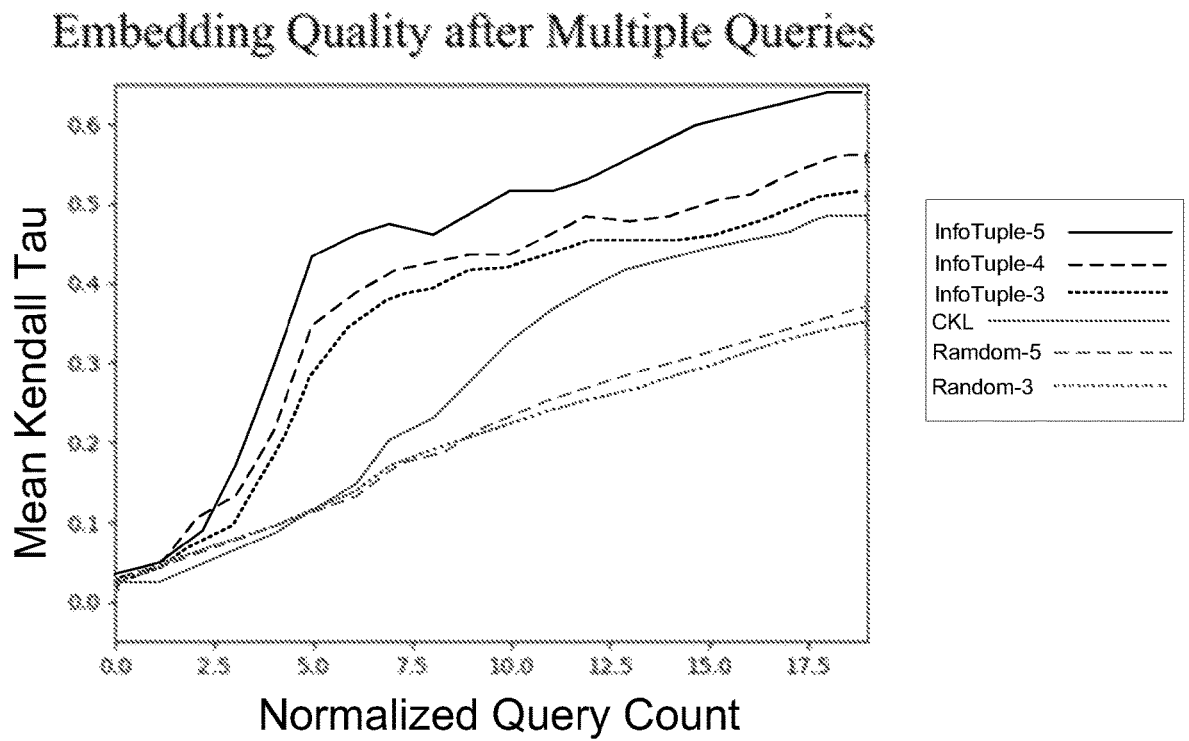
FIGS. 5A-5D are graphs of the results of example similarity learning systems, according to some embodiments of the present disclosure.
Figure 5B:
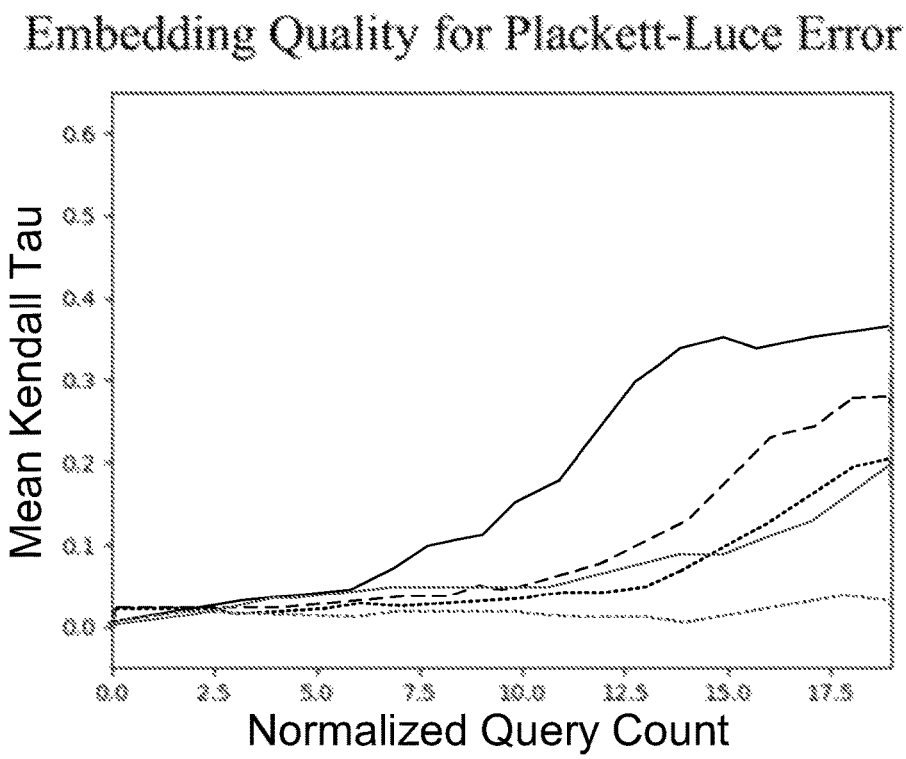
Figure 5C:
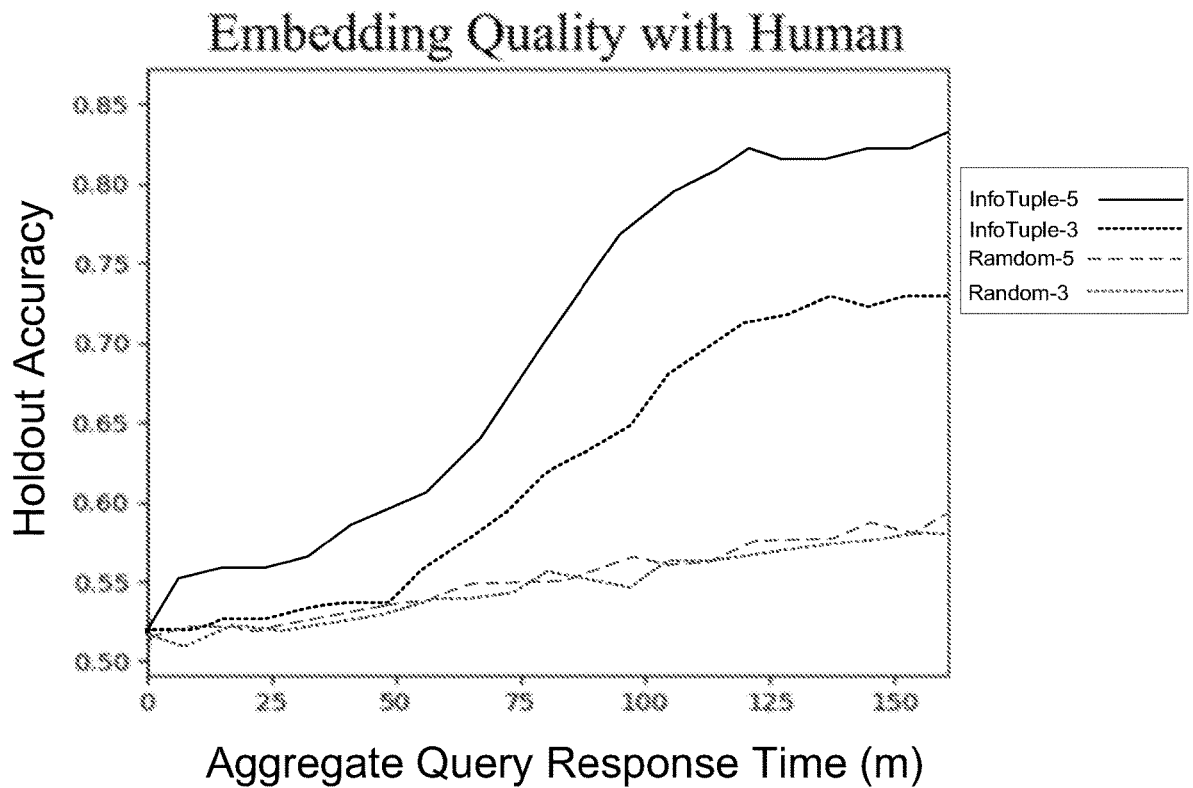

FIGS. 5A-5D are graphs of the results of example similarity learning systems, according to some embodiments of the present disclosure. FIG. 5A shows a comparison of the fidelity of the learned embedding to the ground truth embedding with a simulated deterministic oracle. FIG. 5B shows a comparison of the fidelity of the learned embedding to the ground truth embedding with a simulated stochastic oracle. FIG. 5C shows holdout accuracy on human-subject tests with N=5000. A direct comparison of embedding quality is shown from using InfoTuple, CKL, and Random queries under a simulated deterministic oracle (FIG. 5A) and two simulated stochastic oracles (FIG. 5B). InfoTuple consistently outperformed the other methods. Two important observations from these results can be noted. First, regardless of the oracle used, larger tuple sizes for InfoTuple tended to perform better and converge faster than did smaller tuple sizes even after normalizing for the tuple size, showing the benefit of larger tuples beyond just providing more constituent triplets. Second, results on Random-3, Random-4, and Random-5 are comparable, implying both that the improvements seen in InfoTuple are not solely due to the difference in tuple sizes and that the choice of normalization is appropriate.

Figure 5D:
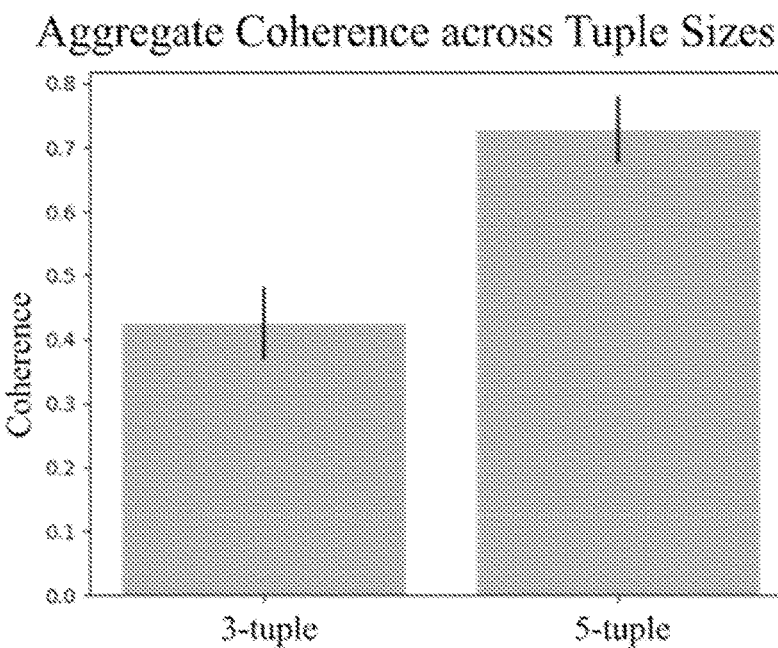

A reason for why tuples outperform triplets is that asking a query that contains more objects provides additional context for the oracle about the contents of the dataset, allowing it to more reliably respond to ambiguous comparisons than if these were asked as triplet queries. As a result of this increase in context, oracles tend to respond to larger queries significantly more coherently than they do to smaller ones. FIG. 5D is a graph measuring the coherence for all tuples of size 3 and size 5. Each size comprised more than 80,000 tuples. Measuring the coherence with respect to an aggregate embedding learned for each tuple size, it is shown that there is a significant difference in their internal coherence as measured by a t-test (p=0.007181).

Implementing the Active Ordinal Ordering for Tuplewise Similarity Learning

Figure 6:
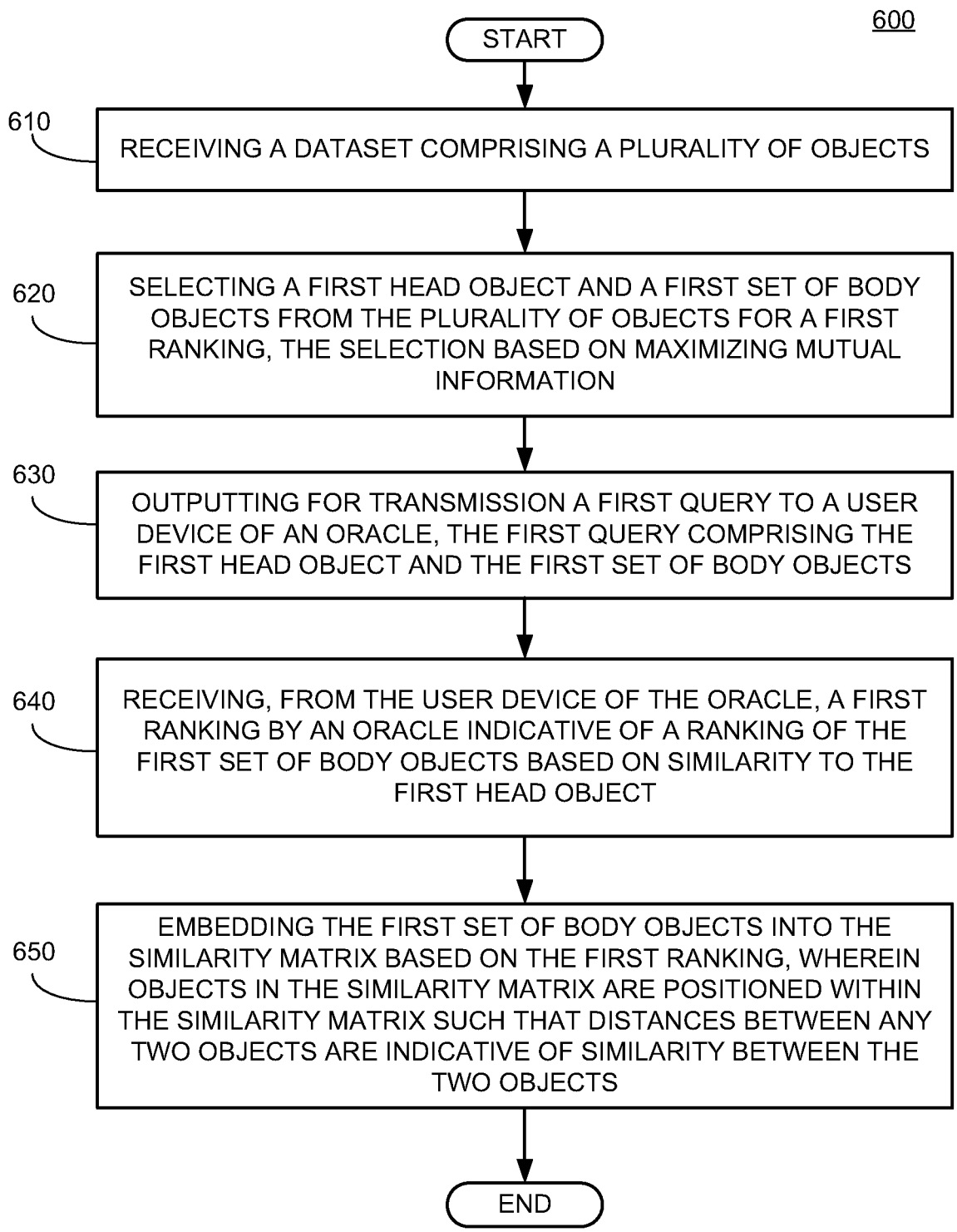
FIG. 6 is a flowchart illustrating an example process for embedding similar objects into a similarity matrix, according to some embodiments of the present disclosure.

FIG. 6 is a flowchart illustrating an example process 600 for embedding similar objects into a similarity matrix, according to some embodiments of the present disclosure. Process 600 can be performed, for example, by the systems described hereinafter, including but not limited to the example computing system architecture 700 of FIG. 7.

Process 600 can begin at block 610, which can include receiving a dataset comprising a plurality of objects. At block 620, process 600 can include selecting a first head object and a first set of body objects from the plurality of objects for a first ranking. The selection of the first head object and first set of body objects can be based on maximizing mutual information to be gained from a ranking of the set of body objects. Several examples are described herein to maximize mutual information, including those examples in reference to Equation 12 and the assumptions in (A1)-(A4). For example, the mutual information can be calculated based on conditional entropy. Maximizing mutual information can also include (1) selecting objects from among the plurality of objects such that a similarity ranking of the first set of body objects to the first head object is nonobvious and/or (2) selecting objects from among the plurality of objects such that a similarity ranking of the first set of body objects to the first head object is unambiguous.

At block 630, process 600 can include outputting for transmission a first query to a user device of an oracle. The first query can include the first head object and the first set of body objects and a request to rank the first set of body objects based on similarity to the first head object. The first query can be transmitted via an input/output interface (e.g., a keyboard interface 706, a display interface 704, a presence-sensitive input interface 708, a network connection interface 712, a camera interface 714, or a sound interface 716 like those described in FIG. 7 or another input/output interface). The user device can be similar to user device 810 of FIG. 8. The oracle can be a single user or a plurality of users responding to a crowd-sourced query set. In some examples, the oracle can be stochastic, as it is shown that the present systems and methods can account for such oracles.

At block 640, process 600 can include receiving, from the user device of the oracle, the first ranking of the first set of body objects based on similarity to the first head object. The first ranking can represent an oracle ranking of the first set of body objects based on similarity to the first head object. At block 650, process 600 can include embedding, for example with the processor, the first set of body objects into the similarity matrix. The objects in the similarity matrix can be positioned within the similarity matrix such that distances between any two objects are indicative of similarity between the two objects.

As described throughout this disclosure, a benefit of the present scheme enables the query to include a tuple size (k≥3), which is an improvement over previous systems and methods. To this end, the first set of body objects and second set of body objects described in process 00 can comprises at least three objects from the plurality of objects. An increase in tuple size, for example at least four objects, can also increase the coherence of the responses.

Process 600 can end after block 650. In other examples, the process can be repeated any number of times with any number of oracles to improve the similarity-tracking of the objects within the space. For example, process 600 can include outputting for transmission a plurality of queries to a plurality of oracles. The plurality of queries can include a second head object and a second set of body objects. Process 600 can include receiving, from user devices of the plurality of oracles, a ranking set of the plurality of queries, the ranking set representing an oracle ranking for each of the plurality of oracles of the second set of body objects based on similarity to the second head object. Process 600 can include repositioning the objects in the similarity matrix based on the second ranking and re-embedding the second set of body objects into the similarity matrix. The plurality of oracles, and thus the responses to the plurality of queries, can be crowd sourced.

In some cases, the plurality of objects may be initially positioned in the similarity matrix (e.g., either through an initialization of the objects before any queries are made or a previous embedding of the objects), such that a distance between any two items is indicative of a similarity between the two items. The embedding of the plurality of objects at 650, therefore, can be a re-embedding of the objects to reflect the first ranking. For example, the position of the objects in the similarity matrix can be recalculated based on the new information gathered about the rankings of the objects. This is important for cases wherein the matrix is configured such that the distances between any two objects is indicative of similarity. The extra context provided by the present systems and methods can increase the accuracy of the similarity matrix.

Example Computing System Architecture

Figure 7:
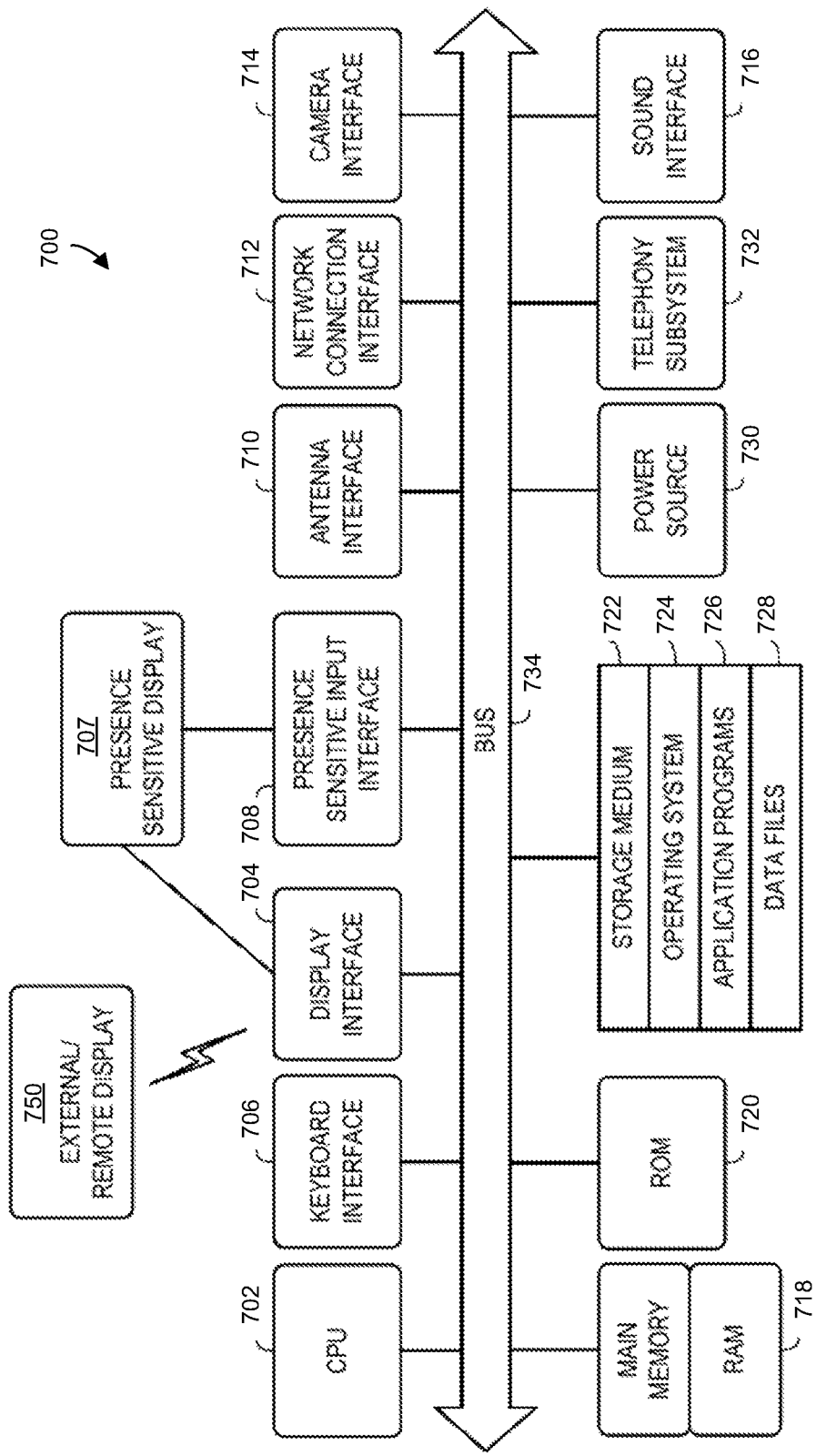
FIG. 7 is a block diagram of an illustrative computing system architecture, according to some embodiments of the present disclosure.

FIG. 7 is a block diagram of an illustrative computing system architecture 700, according to an example implementation. As non-limiting examples, the preference and similarity embedding and search described herein can be implemented using one or more elements from the computing system architecture 700. It will be understood that the computing device architectur 700 is provided for example purposes only and does not limit the scope of the various implementations of the present disclosed systems, methods, and computer-readable mediums.

The computing device architecture 700 of FIG. 7 includes a central processing unit (CPU) 702, where computer instructions are processed, and a display interface 704 that acts as a communication interface and provides functions for rendering video, graphics, images, and texts on the display. In certain example implementations of the disclosed technology, the display interface 704 may be directly connected to a local display, such as a touch-screen display associated with a mobile computing device. In another example implementation, the display interface 704 may be configured for providing data, images, and other information for an external/remote display 750 that is not necessarily physically connected to the mobile computing device. For example, a desktop monitor may be used for mirroring graphics and other information that is presented on a mobile computing device. In certain example implementations, the display interface 704 may wirelessly communicate, for example, via a Wi-Fi channel or other available network connection interface 712 to the external/remote display 750.

In an example implementation, the network connection interface 712 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 704 may be operatively coupled to a local display, such as a touch-screen display associated with a mobile device. In another example, the display interface 704 may be configured to provide video, graphics, images, text, other information, or any combination thereof for an external/remote display 750 that is not necessarily connected to the mobile computing device. In one example, a desktop monitor may be used for mirroring or extending graphical information that may be presented on a mobile device. In another example, the display interface 704 may wirelessly communicate, for example, via the network connection interface 712 such as a Wi-Fi transceiver to the external/remote display 750.

The computing device architecture 700 may include a keyboard interface 706 that provides a communication interface to a keyboard. In one example implementation, the computing device architecture 700 may include a presence-sensitive input interface 708 for connecting to a presence-sensitive display 707. According to certain example implementations of the disclosed technology, the presence-sensitive input interface 708 may provide a communication interface to various devices such as a pointing device, a touch screen, a depth camera, etc., which may or may not be associated with a display.

The computing device architecture 00 may be configured to use an input device via one or more of input/output interfaces (for example, the keyboard interface 706, the display interface 704, the presence-sensitive input interface 708, the network connection interface 712, the camera interface 714, the sound interface 716, etc.) to enable a user to capture information into the computing device architecture 700. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 700 or may be a separate device. For example, the input device may be an accelerometer, a magnetometer, a digital camera, a microphone, and an optical sensor.

Example implementations of the computing device architecture 700 may include an antenna interface 710 that provides a communication interface to an antenna; a network connection interface 712 that provides a communication interface to a network. As mentioned above, the display interface 704 may be in communication with the network connection interface 712, for example, to provide information for display on a remote display that is not directly connected or attached to the system. In certain implementations, a camera interface 714 is provided that acts as a communication interface and provides functions for capturing digital images from a camera. In certain implementations, a sound interface 716 is provided as a communication interface for converting sound into electrical signals using a microphone and for converting electrical signals into sound using a speaker. According to example implementations, a random-access memory (RAM) 718 is provided, where computer instructions and data may be stored in a volatile memory device for processing by the CPU 702.

According to an example implementation, the computing device architecture 700 includes a read-only memory (ROM) 720 where invariant low-level system code or data for basic system functions such as basic input and output (I/O), startup, or reception of keystrokes from a keyboard are stored in a non-volatile memory device. According to an example implementation, the computing device architecture 700 includes a storage medium 722 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 724, application programs 726 (including, for example, a web browser application, a widget or gadget engine, and or other applications, as necessary) and data files 728 are stored. According to an example implementation, the computing device architecture 700 includes a power source 730 that provides an appropriate alternating current (AC) or direct current (DC) to power components.

According to an example implementation, the computing device architecture 700 includes a telephony subsystem 732 that enables the example computing system architecture 700 to transmit and receive sound over a telephone network. The constituent devices and the CPU 702 communicate with each other over a bus 734.

According to an example implementation, the CPU 702 has appropriate structure to be a computer processor. In one arrangement, the CPU 702 may include more than one processing unit. The RAM 718 interfaces with the computer bus 734 to provide quick RAM storage to the CPU 702 during the execution of software programs such as the operating system application programs, and device drivers. More specifically, the CPU 702 loads computer-executable process steps from the storage medium 722 or other media into a field of the RAM 718 to execute software programs. Data may be stored in the RAM 718, where the data may be accessed by the computer CPU 702 during execution.

The storage medium 722 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 722, which may include a machine-readable storage medium.

According to one example implementation, the term computing device, as used herein, may be a CPU, or conceptualized as a CPU (for example, the CPU 702 of FIG. 7). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 8:
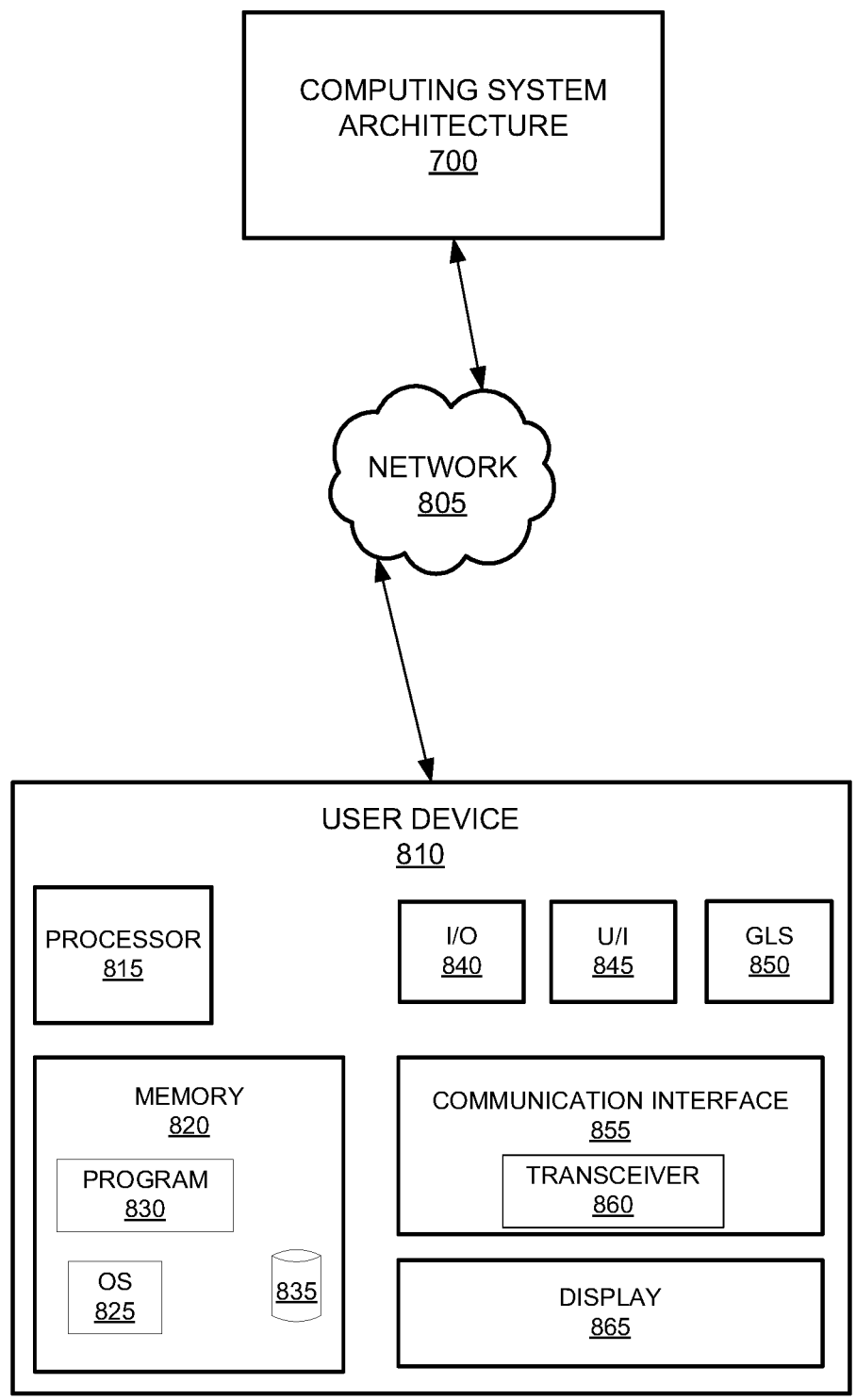
FIG. 8 is a diagram of an example system that can be used to link a computing system architecture to a user device, according to some embodiments of the present disclosure.

FIG. 8 is a diagram of an example system 800 that can be used to link a computing system architecture 700 to a user device 810, according to some examples of the present disclosure. A user device 810 may connect to the computing system architecture 700 of FIG. 7, for example, via a network 805. The network 805 can be of any suitable type, including individual connections via the internet such as wired or wireless networks. The wired networks can be an Ethernet network and the wireless networks can be cellular or WiFi™ networks, for example. In some examples, network 805 can connect terminals, services, and mobile devices using direct connections such as radio-frequency identification (RFID), near-field communication (NFC), Bluetooth™, low-energy Bluetooth™ (BLE), WiFi™, Zig-Bee™ ambient backscatter communications (ABC) protocols, USB, WAN, or LAN.

The user device 810 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The user device 810 can include a processor 815, which can be similar to the CPU 702 described above for the computing system architecture 700.

The user device 810 can also include a memory 820, which can be similar to the main memory, RAM 718, and ROM 720 described above for the computing system architecture 700. The memory 820 can contain an operating system ("OS") 825 that can run one or more programs 830 to perform any of the functions described herein, including providing preferences for or rankings of the items. The user device 810 can include data storage 835, which can be similar to storage medium 722 described above for the computing system architecture 700.

The user device 810 can also include one or more input/output ("I/O") devices 840 that can include one or more interfaces for receiving signals or input from devices and providing signals or output to one or more devices that allow data to be received and/or transmitted by the user device 810. For example, the user device 810 can include interface components, which can provide interfaces to one or more input devices, such as one or more keyboards, mouse devices, touch screens, track pads, trackballs, scroll wheels, digital cameras, microphones, sensors, and the like, that enable the user device 810 to receive data from one or more users.

The user device 810 can also include a user interface ("U/I") device 845 for receiving user input data, such as data representative of a click, a scroll, a tap, a press, or typing on an input device that can detect tactile inputs. According to some examples, U/I device 845 can include some or all of the components described with respect to I/O device 840 above. The U/I device 845 can be defined as the "input" of the user device 810. The user device 810 can also include a geographic location sensor ("GLS") 850l for determining the geographic location of the user device 810.

The user device 810 can include a communication interface 855for communicating with external systems. The communication interface 855 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof The communication interface 855 can include a transceiver 860 to communication with compatible device. A transceiver 860 can be compatible with one or more of: radio-frequency identification (RFID), near-field communication (NFC), Bluetooth™, low-energy Bluetooth™ (BLE), WiFi™, ZigBee™, ambient backscatter communications (ABC) protocols, or similar technologies that enables the user device 810 to communication via the network 805, as described herein.

The user device 810 can also include a display 865. The display 865 can provide visual representation of the various queries described herein. The display 865 can also be a U/I device 845 in the case that the user device 810 as touch-screen capabilities. In other words, in some examples the display 865 can be the "input" of the user device 810.

An embodiment of the present disclosure may be implemented according to at least the following:

Clause 1: A method of embedding a user preference comprising: receiving, at an input/output interface, a dataset comprising a plurality of items; identifying, with a processor, a paired comparison of a first item and a second item of the plurality of items for transmittal to a user device for comparison; receiving, at the input/output interface, a user preference of the first item over the second item to create a user preference point; and embedding, with the processor, the user preference point in a space with the plurality of items, the user preference point being embedded in the space such that a distance between the user preference point and respective items of the plurality of items is indicative of the user preference of the respective items.

Clause 2: The method of clause 1, wherein the dataset is received from a training set of triplet comparison queries.

Clause 3: The method of clause 2, wherein the training set of triplet comparison queries is indicative of a Crowd Kernel Learning technique or a Stochastic Triplet Embedding technique.

Clause 4: The method of any of clauses 1-3, wherein the dataset is received from a plurality of tuple comparisons.

Clause 5: The method of any of clauses 1-4, further comprising embedding, with the processor, the user preference point and the plurality of items in a Euclidean space.

Clause 6: The method of any of clauses 1-5, wherein identifying the paired comparison comprises actively selecting informative queries.

Clause 7: The method of any of clauses 1-6, wherein identifying the paired comparison comprises ignoring, with the processor, ambiguous paired comparisons in the plurality of items.

Clause 8: The method of any of clauses 1-7, wherein identifying the paired comparison is based on an equiprobable, max-variance scheme.

Clause 9: The method of any of clauses 1-8, wherein identifying the paired comparison is based on a mean cut, max-variance scheme.

Clause 10: The method of any of clauses 1-9, further comprising identifying, with the processor, a third item that corresponds to the user preference, the identification based on a proximity of the third item to the user preference in the space.

Clause 11: The method of clause 10, wherein identifying, with the processor, the paired comparison minimizes a quantity of queries required to identify the third item.

Clause 12: The method of any of clauses 1-11, wherein the plurality of items is initially embedded in the space when the dataset is received.

Clause 13: The method of clause 12, wherein the user preference is initially embedded in the space when the dataset is received, and embedding the user preference point in the space comprises repositioning the user preference point in accordance with the user preference.

Clause 14. The method of clause 12, wherein embedding the user preference point in the space comprises repositioning one or more of the plurality of items in accordance with the user preference.

Clause 15: A system for embedding a user preference comprising: an input/output interface configured to communicate with a user device and to receive a dataset comprising a plurality of items; a processor in communication with the input/output interface; and a memory in communication with the processor and storing instructions that, when executed, cause the system to: identify a paired comparison of a first item and a second item of the plurality of items for transmittal to a user for comparison; receive a user preference of the first item over the second item to create a user preference point; and embed the user preference point in a space with the plurality of items, the user preference point being embedded in the space such that a distance between the user preference point and respective items of the plurality of items is indicative of the user preference of the respective items.

Clause 16: The system of clause 15, wherein the instructions further cause the system to receive the dataset from a training set of triplet comparison queries.

Clause 17: The system of clause 16, wherein the training set of triplet comparison queries is indicative of a Crowd Kernel Learning technique or a Stochastic Triplet Embedding technique.

Clause 18: The system of any of clauses 1-17, wherein the instructions further cause the system to receive the dataset from a plurality of tuple comparisons.

Clause 19: The system of any of clauses 1-18, wherein the instructions further cause the system to embed the user preference point and the plurality of items in a Euclidean space.

Clause 20: The system of any of clauses 1-19, wherein, to identify the paired comparison, the instructions further cause the system to actively select informative queries.

Clause 21: The system of any of clauses 1-20, wherein identifying the paired comparison is based on an equiprobable, max-variance scheme.

Clause 22: The system of any of clauses 1-21, wherein identifying the paired comparison is based on a mean cut, max-variance scheme.

Clause 23: The system of any of clauses 1-22, wherein the instructions further cause the system to identify a third item that corresponds to the user preference, wherein identifying the third item is based on proximity of the third item to the user preference point in the space.

Clause 24: The system of clause 23, wherein identifying the paired comparison minimizes a quantity of queries required to identify the third item.

Clause 25: A method of embedding similar objects into a similarity matrix, the method comprising: receiving, at an input/output interface, a dataset comprising a plurality of objects; selecting, with a processor, a first head object and a first set of body objects from the plurality of objects for a first ranking, the selection based on maximizing mutual information to be gained from the first ranking in the dataset, the first set of body objects comprising at least three objects; outputting for transmission, from the input/output interface, a first query to a user device of an oracle, the first query comprising the first head object and the first set of body objects; receiving, at the input/output interface and from the user device of the oracle, a first ranking by an oracle indicative of a ranking of the first set of body objects based on similarity to the first head object; and embedding, with the processor, the first set of body objects into the similarity matrix based on the first ranking, wherein objects in the similarity matrix are positioned within the similarity matrix such that distances between any two objects are indicative of similarity between the two objects.

Clause 26: The method of clause 25, further comprising: selecting, with the processor, a second head object and a second set of body objects for a second ranking, the selection based on maximizing mutual information to be gained from the second ranking in the dataset; outputting for transmission, from the input/output interface, a second query to the user device of the oracle, the second query comprising the second head object and the second set of body objects; receiving, at the input/output interface and from the user device of the oracle, a second ranking by an oracle indicative of a ranking of the second set of body objects based on similarity to the second head object; repositioning, with the processor, the plurality of objects in the similarity matrix based on the second ranking; and embedding, with the processor, the second set of body objects into the similarity matrix.

Clause 27: The method of any of clauses 1-26, wherein maximizing mutual information in the similarity matrix comprises calculating, with the processor, mutual information based on conditional entropy.

Clause 28: The method of any of clauses 1-27, wherein maximizing mutual information in the similarity matrix comprises: selecting objects from among the plurality of objects such that a similarity ranking of the first set of body objects to the first head object is nonobvious; and selecting objects from among the plurality of objects such that a similarity ranking of the first set of body objects to the first head object is unambiguous.

Clause 29: The method of any of clauses 1-28, wherein the first set of body objects comprises at least four objects.

Clause 30: The method of any of clauses 1-29, further comprising: outputting for transmission, from the input/output interface, a plurality of queries to a plurality of oracles, the plurality of queries comprising a second head object and a second set of body objects; receiving, at the input/output interface and from user devices of the plurality of oracles, a ranking set of the plurality of queries by each of the plurality of oracles indicative of a ranking of the second set of body objects based on similarity to the second head object; repositioning, with the processor, objects in the similarity matrix based on the oracle ranking; and embedding, with the processor, the second set of body objects into the similarity matrix.

Clause 31: The method of clause 30, wherein the ranking set is crowd sourced.

Clause 32: The method of clause 30, wherein the plurality of oracles is stochastic.

Clause 33: The method of any of clauses 1-32, wherein the oracle is stochastic.

Clause 34: The method of any of clauses 1-33, wherein the dataset is received with the plurality of objects embedded in the similarity matrix, and wherein embedding the plurality of objects into the similarity matrix comprises re-embedding the first set of body objects into the similarity matrix based on the first ranking.

Clause 35: A system for embedding similar objects into a similarity matrix comprising: an input/output interface configured to communicate with a user device; a processor in communication with the input/output interface; and a memory in communication with the processor and storing instructions that, when executed, cause the system to: receive a dataset comprising a plurality of objects; select a first head object and a first set of body objects from the plurality of objects for a first ranking, the selection based on maximizing mutual information in the dataset; output for transmission a first query to the user device of an oracle, the first query comprising the first head object and the first set of body objects; receive from the user device a first ranking of the first query, the first ranking representing an oracle raking of the first set of body objects based on similarity to the first head object; and embed the plurality of objects into the similarity matrix based on the first ranking, wherein objects in the similarity matrix are positioned within the similarity matrix such that distances between any two objects are indicative of similarity between the two objects, wherein the first set of body objects comprises at least three objects.

Clause 36: The system of clause 35, wherein the instructions further cause the system to: select a second head object and a second set of body objects for a second ranking, the selection based on maximizing mutual information in the similarity matrix; output for transmission a second query to the user device of the oracle, the second query comprising the second head object and the second set of body objects; receive from the user device a second ranking of the second query, the second ranking representing an oracle ranking of the second set of body objects based on similarity to the second head object; reposition the plurality of objects in the similarity matrix based on the second ranking; and re-embed the second set of body objects into the similarity matrix.

Clause 37: The system of any of clauses 1-36, wherein, to maximize the mutual information in the similarity matrix, the instructions further cause the system to calculate a mutual information based on conditional entropy.

Clause 38: The system of any of clauses 1-37, wherein, to maximize the mutual information in the similarity matrix, the instructions further cause the system to: select objects from among the plurality of objects such that a similarity ranking of the first set of body objects to the first head object is nonobvious; and select objects from among the plurality of objects such that a similarity ranking of the first set of body objects to the first head object is unambiguous.

Clause 39: The system of any of clauses 1-38, wherein the first set of body objects comprises at least four objects.

Clause 40: The system of any of clauses 1-39, wherein the instructions further cause the system to: output for transmission a plurality of queries to a plurality of oracles, the plurality of queries comprising a second head object and a second set of body objects; receive from user devices of the plurality of oracles a ranking set of the plurality of queries, the ranking set representing an oracle ranking for each of the plurality of oracles of the second set of body objects based on similarity to the second head object; reposition objects in the similarity matrix based on the oracle ranking; and re-embed the second set of body objects into the similarity matrix.

Clause 41: The system of clause 40, wherein the ranking set is crowd sourced.

Clause 42: The system of clause 40, wherein the plurality of oracles is stochastic.

Clause 43: The system of any of clauses 1-42, wherein the oracle is stochastic.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of embedding a user preference comprising:
receiving, at an input/output interface, a dataset comprising a plurality of items;
embedding, with a processor, the plurality of items as coordinate vectors in a d-dimensional Euclidean space;
generating, with the processor, a similarity matrix, the similarity matrix comprising Euclidean distances between coordinate vectors of the plurality of items;
actively selecting informative queries by:
identifying, with the processor, at least two paired comparisons of a first item and a second item of the plurality of items for transmittal to a user device for comparison;
receiving, at the input/output interface, for each of the at least two paired comparisons, a user preference of the first item over the second item to create a user preference point; and
subsequent to receiving the at least two paired comparisons, Euclidean embedding, with the processor, each user preference point in the d-dimensional Euclidean space with respect to the coordinate vectors such that distances between each user preference point and respective items of the plurality of items are indicative of corresponding user preference; and
identifying a subsequent paired comparison by using the similarity matrix generated from the embeddings of the plurality of items in combination with distances between user preference points and corresponding items of the plurality of items in the d-dimensional Euclidean space.

2. The method of claim 1, wherein the dataset is received from a training set of triplet comparison queries.

3. The method of claim 2, wherein the training set of triplet comparison queries is indicative of a Crowd Kernel Learning technique or a Stochastic Triplet Embedding technique.

4. The method of claim 1, wherein the dataset is received from a plurality of tuple comparisons.

5. The method of claim 1, wherein identifying the paired comparison comprises ignoring, with the processor, ambiguous paired comparisons in the plurality of items.

6. The method of claim 1, wherein identifying the paired comparison is based on an equiprobable, max-variance scheme.

7. The method of claim 1, wherein identifying the paired comparison is based on a mean cut, max-variance scheme.

8. The method of claim 1 further comprising identifying, with the processor, a third item that corresponds to the user preference, the identification based on a proximity of the third item to the user preference in the space.

9. The method of claim 8, wherein identifying, with the processor, the paired comparison minimizes a quantity of queries required to identify the third item.

* * * * *